(12) United States Patent
Kim et al.

(10) Patent No.: US 11,886,747 B2
(45) Date of Patent: Jan. 30, 2024

(54) CONTROLLER, STORAGE DEVICE AND OPERATION METHOD OF THE STORAGE DEVICE

(71) Applicant: Samsung Electronics Co., Ltd., Suwon-si (KR)

(72) Inventors: Chanha Kim, Hwaseong-si (KR); Gyeongmin Nam, Seoul (KR); Seungryong Jang, Yangpyeong-gun (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 58 days.

(21) Appl. No.: 17/741,755

(22) Filed: May 11, 2022

(65) Prior Publication Data

US 2023/0127449 A1    Apr. 27, 2023

(30) Foreign Application Priority Data

Oct. 26, 2021  (KR) ........................ 10-2021-0143294

(51) Int. Cl.
G06F 3/06       (2006.01)
G06F 12/02      (2006.01)

(52) U.S. Cl.
CPC .......... *G06F 3/0659* (2013.01); *G06F 3/0604* (2013.01); *G06F 3/0679* (2013.01); *G06F 12/0238* (2013.01)

(58) Field of Classification Search
None
See application file for complete search history.

(56) References Cited

U.S. PATENT DOCUMENTS

| | | | |
|---|---|---|---|
| 7,287,118 B2 * | 10/2007 | Chang ................. | G11C 16/349 365/230.03 |
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,496,043 B1 * | 11/2016 | Camp .................. | G11C 16/349 |

(Continued)

OTHER PUBLICATIONS

Dongchul Park, et al. "Hot Data Identification for Flash-based Storage Systems Using Multiple Bloom Filters", Department of Computer Science and Engineering University of Minnesota, 2011.

*Primary Examiner* — Elias Mamo
(74) *Attorney, Agent, or Firm* — Harness, Dickey & Pierce, P.L.C.

(57) ABSTRACT

A controller includes a central processing unit (CPU) configured to insert a latest received logical address, received together with a write command and data from a host, into a logical address list; a hotness determining circuit configured to assign a maximum weight to the latest received logical address, decrease weights of received logical addresses included in the logical address list by a decay factor, and sum weights of the received logical addresses having values, equal to a value of the latest received logical address, to determine hotness of the latest received logical address; and a parameter adjustment circuit decreasing a magnitude of the decay factor based on the repeatability index of the received logical addresses included in the logical address list, wherein the CPU is configured to control the memory device to store the data in one of the memory regions based on the hotness.

20 Claims, 14 Drawing Sheets

(56) References Cited

U.S. PATENT DOCUMENTS

| | | | |
|---|---|---|---|
| 9,582,199 B2 | 2/2017 | Ranjith Reddy et al. | |
| 9,761,294 B1* | 9/2017 | Healy | G11C 11/1653 |
| 10,282,324 B2* | 5/2019 | Bhimani | G06F 3/0653 |
| 11,055,002 B2 | 7/2021 | Rao et al. | |
| 2010/0017650 A1* | 1/2010 | Chin | G06F 11/108 |
| | | | 710/22 |
| 2011/0233648 A1 | 9/2011 | Seol et al. | |
| 2014/0365722 A1 | 12/2014 | Yi et al. | |
| 2015/0186055 A1* | 7/2015 | Darragh | G11C 16/3445 |
| | | | 711/103 |
| 2017/0046074 A1 | 2/2017 | Wang et al. | |
| 2017/0285967 A1* | 10/2017 | Pandurangan | G06F 3/0605 |
| 2019/0102083 A1 | 4/2019 | Dusija et al. | |
| 2019/0361609 A1 | 11/2019 | Zhang | |
| 2021/0200454 A1 | 7/2021 | Kim et al. | |

\* cited by examiner

CONTROLLER, STORAGE DEVICE AND OPERATION METHOD OF THE STORAGE DEVICE

CROSS-REFERENCE TO RELATED APPLICATION(S)

This application claims benefit of priority to Korean Patent Application No. 10-2021-0143294 filed on Oct. 26, 2021 in the Korean Intellectual Property Office, the disclosure of which is incorporated herein by reference in its entirety.

BACKGROUND

The present inventive concepts relate to a controller, a storage device, and a method of operating the storage device.

A computer system may include various types of memory systems, and such memory systems may include a memory device and a controller. The memory device may be used to store data and may be divided into a volatile memory device and a non-volatile memory device. The memory device may include a plurality of memory regions having different bit-densities. Write speeds, lifetimes, etc. of the different memory regions may be different from each other.

SUMMARY

Example embodiments of the present inventive concepts provide configurations and operations related to a storage device for separately storing hot data and cold data in memory regions having different bit-densities.

Example embodiments of the present inventive concepts may provide a storage device capable of quickly adapting to a changing workload pattern of a host to accurately determine hotness of a logical address received from the host.

According to example embodiments of the present inventive concepts, a controller for controlling a memory device including a first memory region and a second memory region having a first bit-density and a second bit-density, includes a memory storing a logical address list including a number of received logical addresses; a central processing unit (CPU) configured to insert a latest received logical address, received together with a write command and data from a host, into the logical address list; a hotness determining circuit configured to assign a maximum weight to the latest received logical address, decrease weights of the received logical addresses included in the logical address list by a decay factor, and sum weights of logical addresses having values, equal to a value of the latest received logical address, to determine hotness of the latest received logical address; a pattern detection circuit configured to determine a repeatability index of logical addresses included in the logical address list; and a parameter adjustment circuit configured to decrease a magnitude of the decay factor based on the repeatability index, to upwardly adjust the weights of the received logical addresses, wherein the CPU is further configured to control the memory device to store the data in the first memory region or the second memory region based on the hotness of the latest received logical address.

According to example embodiments of the present inventive concepts, a method of operating a storage device including a first memory region and a second memory region having different bit-densities, includes receiving a write command, a latest received logical address, and data from a host; inserting the latest received logical address into a logical address list including a predetermined or desired number of received logical addresses; determining a repeatability index of logical addresses inserted into the logical address list; adjusting weights of logical addresses included in the logical address list based on the repeatability index; summing weights of logical addresses having values, equal to a value of the latest received logical address, according to the adjusted weights to determine hotness of the latest received logical address; and storing the data in the first memory region or the second memory region based on the hotness of the latest received logical address.

According to example embodiments of the present inventive concepts, a storage device includes a memory device including a plurality of memory regions having different respective bit-densities; and a controller configured to receive a write command, data, and a latest received logical address from a host, determine hotness of the latest received logical address, based on the number of times of which logical addresses having values, equal to a value of the latest received logical address are received, and weights of the logical addresses, and storing the data in any one of the plurality of memory regions, based on the hotness of the latest received logical address, wherein the controller is further configured to determine a repeatability index based on a workload pattern of the host, and upwardly adjusts the weights of the logical addresses based on the repeatability index.

BRIEF DESCRIPTION OF DRAWINGS

The above and other example embodiments, features, and advantages of the present inventive concepts will be more clearly understood from the following detailed description, taken in conjunction with the accompanying drawings, in which.

DETAILED DESCRIPTION

Hereinafter, example embodiments of the present inventive concepts will be described with reference to the accompanying drawings.

Figure 1:
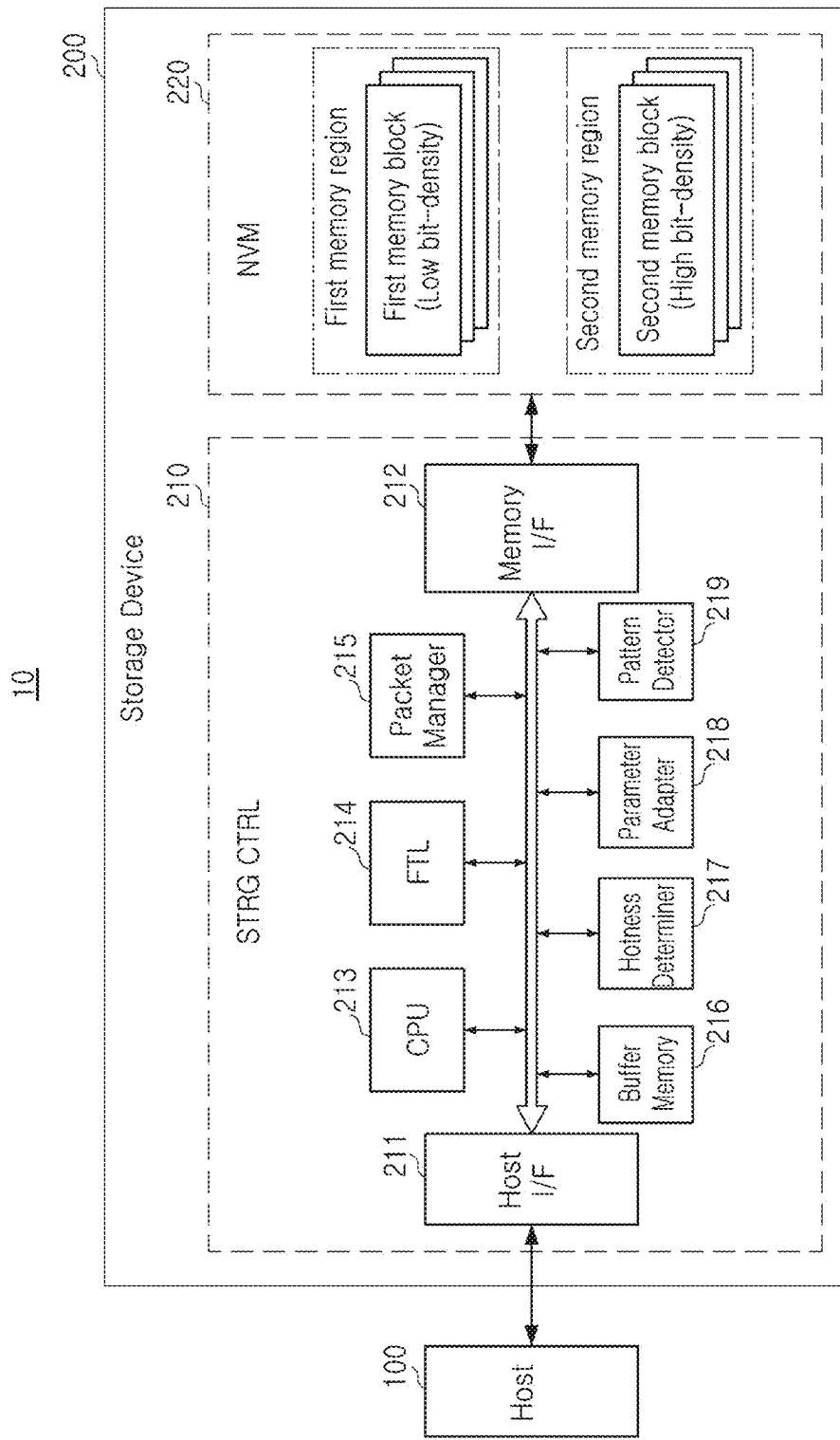
FIG. 1 is a block diagram illustrating a host-storage system according to an example embodiment of the present inventive concepts.

FIG. 1 is a block diagram illustrating a host-storage system according to an example embodiment of the present inventive concepts.

A host-storage system 10 may include a host 100 and a storage device 200. Also, the storage device 200 may include a storage controller (STRG CTRL) 210 and a non-volatile memory (NVM) 220.

The host 100 may include electronic devices, for example, portable electronic devices such as mobile phones, MP3 players, laptop computers, and the like, or electronic devices such as desktop computers, game consoles, TVs, projectors, and the like. The host 100 may include at least one operating system (OS). The operating system may overall manage and control functions and operations of the host 100.

The storage device 200 may include storage media for storing data according to a request from the host 100. As an example, the storage device 200 may include at least one of a solid state drive (SSD), an embedded memory, or a removable external memory. When the storage device 200 is an SSD, the storage device 200 may be a device conforming to a non-volatile memory express (NVMe) standard. When the storage device 200 is an embedded memory or an external memory, the storage device 200 may be a device conforming to a universal flash storage (UFS) standard or an embedded multi-media card (eMMC) standard. The host 100 and the storage device 200 may generate and transmit a packet according to an adopted standard protocol, respectively.

The non-volatile memory 220 may maintain stored data even when power is not supplied. The non-volatile memory 220 may store data provided from the host 100 in a programming operation and may output the data stored in the non-volatile memory 220 in a read operation. The non-volatile memory 220 may include a plurality of memory blocks, each of which may include a plurality of pages, and each of the pages may include a plurality of memory cells connected to a word line. In an example embodiment, the non-volatile memory 220 may be a flash memory.

When the non-volatile memory 220 of the storage device 200 includes a flash memory, the flash memory may include a 2D NAND memory array or a 3D (or a vertical) NAND (VNAND) memory array. As another example, the storage device 200 may include various other types of non-volatile memories. For example, in the storage device 200, a magnetic RAM (MRAM), a spin-transfer torque MRAM, a conductive bridging RAM (CBRAM), a ferroelectric RAM (FeRAM), a phase RAM (PRAM), a resistive memory, and various other types of memory may be applied.

The non-volatile memory 220 may include first memory blocks and second memory blocks having different bit-densities. A storage area provided by the first memory blocks may be referred to as a first memory region, and a storage area provided by the second memory blocks may be referred to as a second memory region.

A bit-density may refer to the number of data bits that a memory cell stores. In the example embodiment of FIG. 1, a bit-density of the first memory region may be relatively lower than a bit-density of the second memory region. For example, the number of bits that may be stored in one memory cell may be relatively smaller in the first memory region, as compared to in the second memory region.

The first memory region and the second memory region having different bit-densities may have different attributes. For example, the second memory region may provide large storage capacity in the same area, as compared to the first memory region. The first memory region may have a faster access speed and a longer lifespan, as compared to the second memory region.

When data having different attributes may be stored separately in memory blocks having different attributes, the non-volatile memory 220 may be efficiently used. For example, when hot data, relatively frequently accessed, is stored in the first memory region, an access speed of the hot data may be improved, and average performance of the storage device 200 may be improved. When cold data, relatively infrequently accessed, is stored in the second memory region, the data stored in the second memory region may be rarely updated. Therefore, write amplification (WAF) of the second memory region may be reduced.

The storage controller 210 may include a host interface 211, a memory interface 212, and a central processing unit (CPU) 213. In addition, the storage controller 210 may further include a flash translation layer (FTL) 214, a packet manager 215, a buffer memory 216, a hotness determiner 217, a parameter adapter 218, and a pattern detector 219. The storage controller 210 may include a working memory (not illustrated) into which the flash translation layer (FTL) 214 is loaded, an error correction code (ECC) engine (not illustrated) detecting and correcting errors in data read from the non-volatile memory 220, and an advanced encryption standard (AES) engine (not illustrated) performing an encryption operation and a decryption operation on data input to the storage controller 210. In addition, write and read operations of data for the non-volatile memory 220 may be controlled by the CPU 213 executing the flash translation layer 214.

The host interface 211 may transmit and receive a packet to and from the host 100. A packet transmitted from the host 100 to the host interface 211 may include a command, data to be written to the non-volatile memory 220, or the like, and a packet transmitted from the host interface 211 to the host 100 may include a response to a command, data to be read from the non-volatile memory 220, or the like.

The memory interface 212 may transmit data to be written to the non-volatile memory 220 to the non-volatile memory 220 or may receive data to be read from the non-volatile memory 220. The memory interface 212 may be implemented to comply with a standard protocol such as a toggle or an open NAND flash interface (ONFI).

The flash translation layer 214 may perform various functions such as address mapping, wear-leveling, and garbage collection. The address mapping operation may be an operation of changing a logical address received from the host 100 into a physical address used to actually store data in the non-volatile memory 220. The wear-leveling may be a technique for preventing excessive degradation of a specific block by ensuring that blocks in the non-volatile memory 220 are used uniformly, and may be implemented by, for example, a firmware technique for balancing erase counts of physical blocks. The garbage collection may be a technique for securing usable capacity in the non-volatile memory 220 by copying valid data of an existing block to a new block and then erasing the existing block.

The packet manager 215 may generate a packet according to an interface protocol negotiated with the host 100 or may parse various types of information from a packet received from the host 100. Also, the buffer memory 216 may temporarily store data to be written to or read from the non-volatile memory 220. The buffer memory 216 may be provided in the storage controller 210 but may be disposed outside the storage controller 210.

The hotness determiner 217 may determine hotness of data based on a workload pattern of the host 100. Whether data is hot data or cold data may be relatively determined in relation to other data. The hotness may refer to a numerical value that indexes a degree of frequent access (e.g., rate of access) for each unit of data in order to determine which data is hot data or cold data. The hotness determiner 217 may classify data received from the host 100 into hot data or cold data according to whether hotness of the data is equal to or higher than a threshold value.

The hotness determiner 217 may determine the hotness of data based on a frequency and recency at which data is received from the host 100. For example, the hotness determiner 217 may determine hotness of data as a higher value, when the data is received several times, and may determine hotness of data as a lower value, when the data is received a long time ago.

According to an example embodiment of the present inventive concepts, the hotness determiner 217 may determine hotness of data, based on a rule that is dynamically changed according to the workload pattern of the host 100.

For example, when small amounts of data are repeatedly received from the host 100, the hotness determiner 217 may use a rule that considers recency more important than a frequency, at which data is received, to determine hotness of the data. When new data are repeatedly received from the host 100 under a workload pattern in which small amounts of data are repeatedly received, there may be a high possibility that the new data will be repeatedly received in the future. Therefore, even when the number of repeated receptions of new data is not high, the data may be determined as hot data by considering recency more important. Specifically, the hotness determiner 217 may greatly increase hotness of data whenever the data are repeatedly received and determine the data as hot data.

Under a workload pattern in which various types of data are received, even when new data are repeatedly received from the host 100, it may be difficult to determine that the data will be repeatedly received in the future. Therefore, the hotness determiner 217 may determine hotness of data by using a rule that considers the number of repeated receptions more important than recency of the data. Specifically, the hotness determiner 217 may increase hotness of data to a small extent each time the data are repeatedly received, to determine the data as hot data after the data has been received a sufficient number of times.

According to an example embodiment of the present inventive concepts, the hotness determiner 217 may quickly respond to a change in workload pattern of the host 100 to accurately distinguish hot data from cold data. When the hotness determiner 217 accurately distinguishes hot data and cold data, the hot data and the cold data may be accurately divided and stored in the first and second memory regions. Therefore, performance and a lifespan of the storage device 200 may be improved.

The parameter adapter 218 may adjust a parameter for an operation of the storage controller 210. According to an example embodiment of the present inventive concepts, the parameter adapter 218 may adjust a parameter used by the hotness determiner 217 to determine hotness, based on a workload pattern of the host 100. Specifically, the parameter adapter 218 may adjust a parameter to increase importance of recency for determining hotness when a workload pattern is a pattern in which small amounts of data are repeatedly received.

The pattern detector 219 may detect a workload pattern of the host 100. For example, the pattern detector 219 may determine whether a current workload pattern of the host 100 is a pattern in which various pieces of data are received or a pattern in which small amounts of data are repeatedly received.

Hereinafter, before describing the operation of the storage device 200 according to an example embodiment of the present inventive concepts, memory blocks having different attributes included in the non-volatile memory 220 will be described, in greater detail, with reference to FIGS. 2 to 4.

Figure 2:
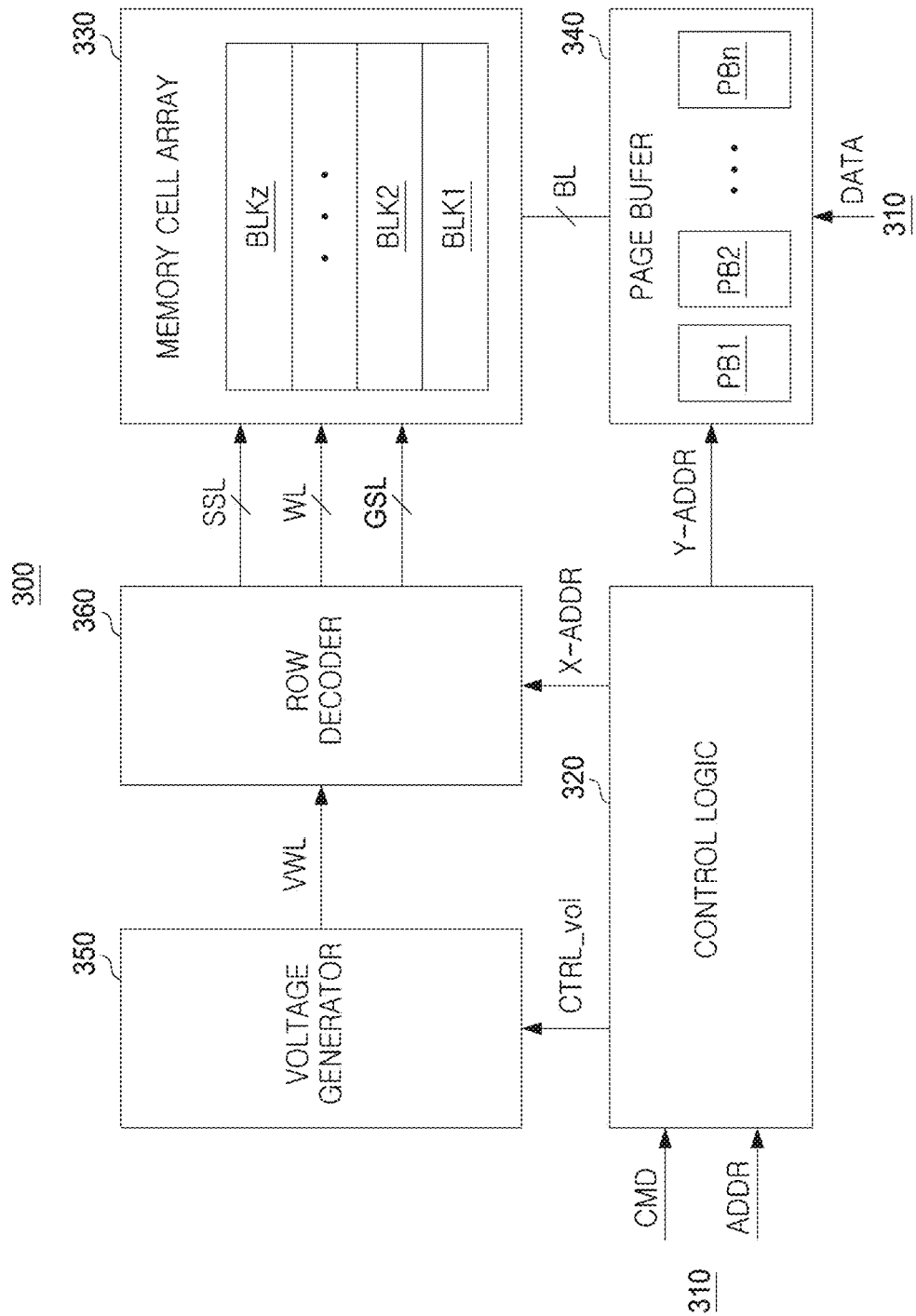
FIGS. 2 to 4 are views illustrating, in greater detail, memory blocks included in a non-volatile memory.

FIG. 2 may be an example block view illustrating a memory device. Referring to FIG. 2, a memory device 300 may include a control logic circuit 320, a memory cell array 330, a page buffer 340, a voltage generator 350, and a row decoder 360. Although not illustrated in FIG. 2, the memory device 300 may further include a memory interface circuit 310 illustrated in FIG. 2, and also may further include a column logic, a pre-decoder, a temperature sensor, a command decoder, an address decoder, or the like.

The control logic circuit 320 may generally control various operations in the memory device 300. The control logic circuit 320 may output various control signals in response to a command CMD and/or an address ADDR from a memory interface circuit 310. For example, the control logic circuit 320 may output a voltage control signal CTRL_vol, a row address X-ADDR, and a column address Y-ADDR.

The memory cell array 330 may include a plurality of memory blocks BLK1 to BLKz (where z is a positive integer), and each of the plurality of memory blocks BLK1 to BLKz may include a plurality of memory cells. The memory cell array 330 may be connected to the page buffer 340 through bit lines BL and may be connected to the row decoder 360 through word lines WL, string select lines SSL, and ground select lines GSL.

In an example embodiment, the memory cell array 330 may include a 3D memory cell array, and the 3D memory cell array may include a plurality of NAND strings. Each of the NAND strings may include memory cells respectively connected to word lines stacked vertically on a substrate. U.S. Pat. Nos. 7,679,133, 8,553,466, 8,654,587, 8,559,235, and U.S. Patent Publication No. 2011/0233648 are incorporated and combined herein by reference in their entirety. In an example embodiment, the memory cell array 330 may include a two-dimensional memory cell array, and the two-dimensional memory cell array may include a plurality of NAND strings arranged in row and column directions.

The page buffer 340 may include a plurality of page buffers PB1 to PBn (where, n is an integer greater than or equal to 3), and the plurality of page buffers PB1 to PBn may be respectively connected to memory cells through a plurality of bit lines BL. The page buffer 340 may select at least one bit line among the bit lines BL in response to the column address Y-ADDR. The page buffer 340 may operate as a write driver or a sense amplifier according to an operation mode. For example, during a programming operation, the page buffer 340 may apply a bit line voltage corresponding to data to be programmed to a selected bit line. During a read operation, the page buffer 340 may sense data stored in the memory cell by sensing a current or a voltage of the selected bit line.

The voltage generator 350 may generate various types of voltages for performing program, read, and erase operations, based on the voltage control signal CTRL_vol. For example, the voltage generator 350 may generate a programming voltage, a read voltage, a programming verify voltage, an erase voltage, or the like, as a word line voltage VWL.

The row decoder 360 may select one of the plurality of word lines WL in response to the row address X-ADDR and may select one of the plurality of string select lines SSL. For example, the row decoder 360 may apply a programming voltage and a programming verify voltage to a selected word line during the programming operation and may apply a read voltage to the selected word line during the read operation.

Figure 3:
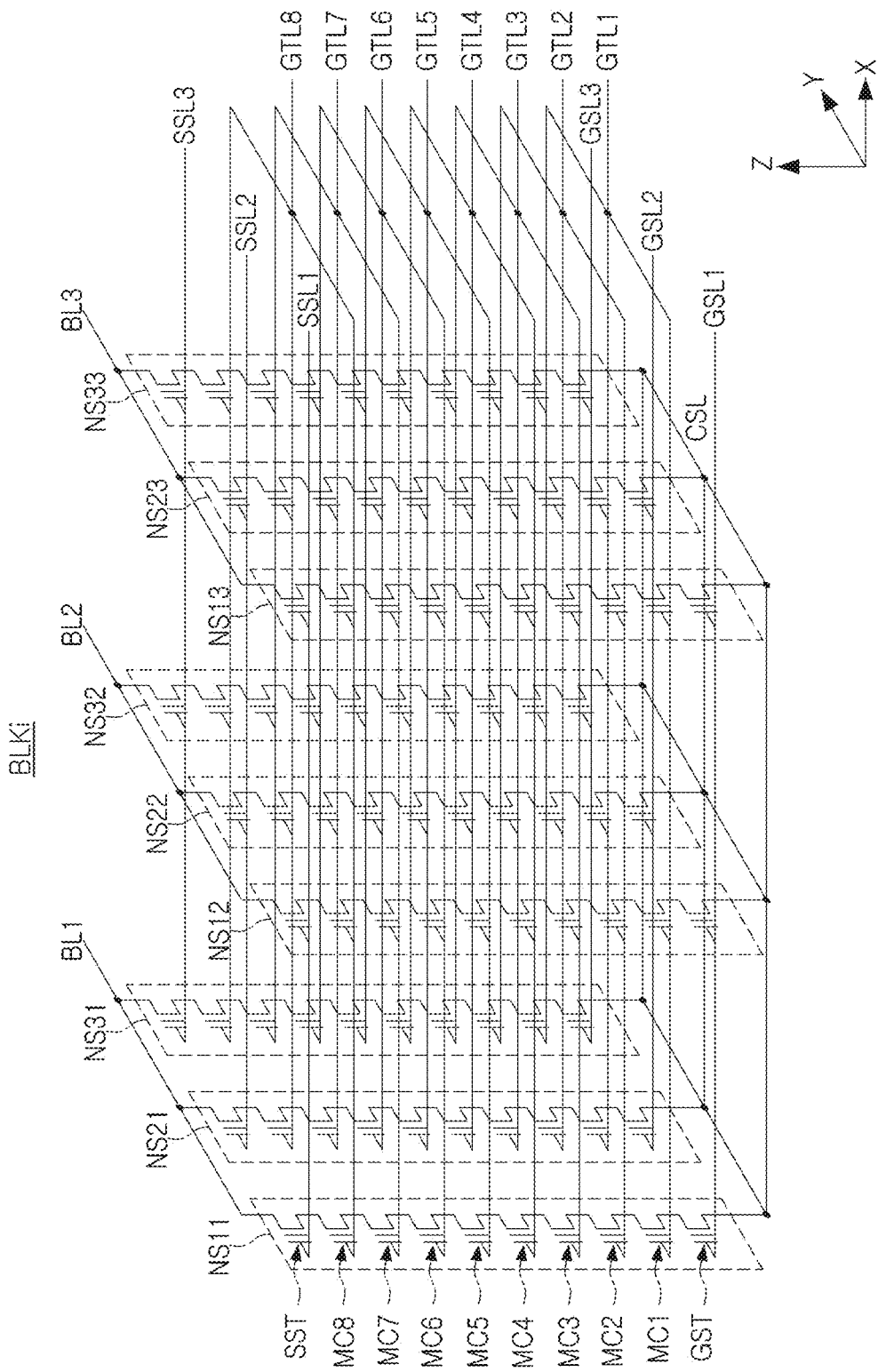

FIG. 3 is a view illustrating a 3D V-NAND structure applicable to a memory device according to an example embodiment of the present inventive concepts. When a storage module of a memory device is implemented as a 3D V-NAND type flash memory, a plurality of memory blocks constituting the storage module may be respectively represented by an equivalent circuit as illustrated in FIG. 3.

A memory block BLKi illustrated in FIG. 3 may represent a three-dimensional memory block formed on a substrate in a three-dimensional structure. For example, a plurality of memory NAND strings included in the memory block BLKi may be formed in a direction, perpendicular to the substrate.

Referring to FIG. 3, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1, MC2, ..., MC8, and a ground select transistor GST. Although it is illustrated in FIG. 3 that each of the plurality of memory NAND strings NS11 to NS33 includes eight memory cells MC1, MC2, ..., MC8, the present inventive concepts are not limited thereto.

The string select transistor SST may be connected to string select lines SSL1, SSL2, and SSL3 corresponding thereto. The plurality of memory cells MC1, MC2, ..., MC8 may be respectively connected to gate lines GTL1, GTL2, ..., GTL8 corresponding thereto. The gate lines GTL1, GTL2, ..., GTL8 may correspond to word lines, and a portion of the gate lines GTL1, GTL2, ..., GTL8 may correspond to dummy word lines. The ground select transistor GST may be connected to ground select lines GSL1, GSL2, and GSL3 corresponding thereto. The string select transistor SST may be connected to the bit lines BL1, BL2, and BL3 corresponding thereto, and the ground select transistor GST may be connected to the common source line CSL.

Word lines having the same height (e.g., WL1) may be commonly connected, and the ground selection lines GSL1, GSL2, and GSL3 and the string select lines SSL1, SSL2, and SSL3 may be separated from each other. In FIG. 3, the memory block BLKi is illustrated as being connected to eight gate lines GTL1, GTL2, ..., GTL8 and three bit lines BL1, BL2, BL3, but the present inventive concepts are not necessarily limited thereto.

The memory block BLKi may have different bit-densities according to the number of bits stored by the memory cells included in the memory block BLKi.

Figure 4:
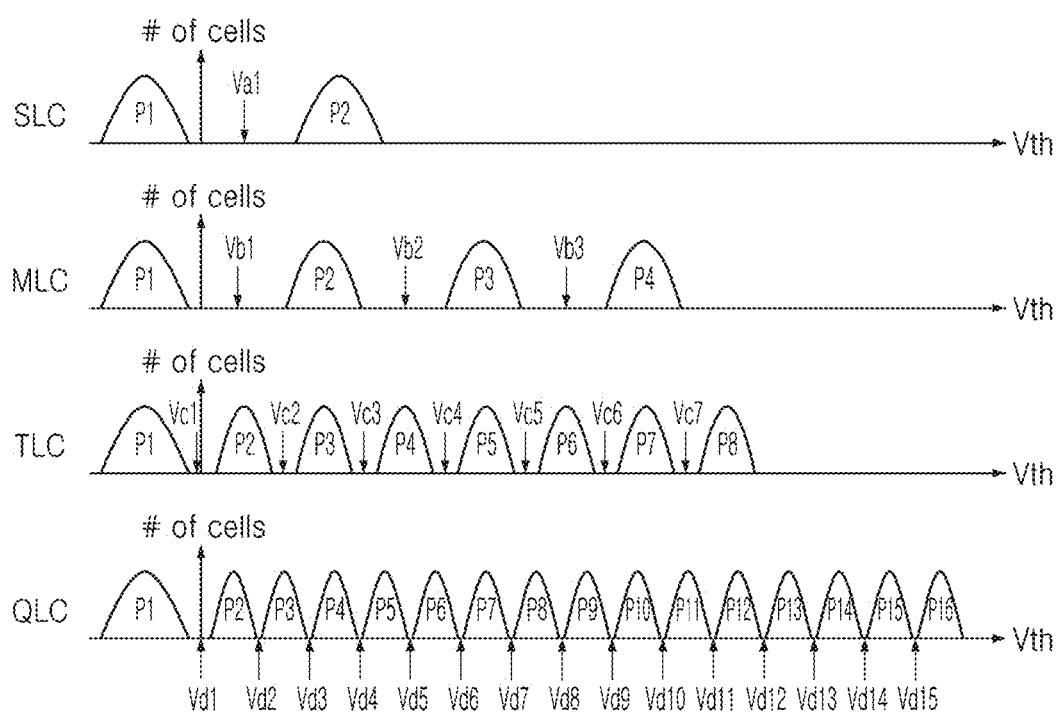

FIG. 4 may be a view illustrating threshold voltage distributions according to the number of bits stored in a memory cell.

Referring to FIG. 4, in each graph, a horizontal axis indicates a magnitude of a threshold voltage, and a vertical axis indicates the number of memory cells.

When a memory cell is a single level cell (SLC) that stores 1-bit data, the memory cell may have a threshold voltage corresponding to any one of a first programming state P1 and a second programming state P2. A read voltage Val may be a voltage for distinguishing the first programming state P1 and the second programming state P2. A memory cell having the first programming state P1 may have a threshold voltage, lower than the read voltage Val, and may be thus read as an on-cell. A memory cell having the second programming state P2 may have a threshold voltage, higher than the read voltage Val, and may be thus read as an off-cell.

When a memory cell is a multiple level cell (MLC) that stores 2-bit data, the memory cell may have a threshold voltage corresponding to any one of first to fourth programming states P1 to P4. First to third read voltages Vb1 to Vb3 may be read voltages for distinguishing each of the first to fourth programming states P1 to P4. The first read voltage Vb1 may be a read voltage for distinguishing the first programming state P1 and the second programming state P2. The second read voltage Vb2 may be a read voltage for distinguishing the second programming state P2 and the third programming state P3. The third read voltage Vb3 may be a read voltage for distinguishing the third programming state P3 and the fourth programming state P4.

When a memory cell is a triple level cell (TLC) that stores 3-bit data, the memory cell may have a threshold voltage corresponding to any one of first to eighth programming states P1 to P8. First to seventh read voltages Vc1 to Vc7 may be read voltages for distinguishing each of the first to eighth programming states P1 to P8. The first read voltage Vc1 may be a read voltage for distinguishing the first programming state P1 and the second programming state P2. The second read voltage Vc2 may be a read voltage for distinguishing the second programming state P2 and the third programming state P3. In the same manner, the seventh read voltage Vc7 may be a read voltage for distinguishing the seventh programming state P7 and the eighth programming state P8.

When a memory cell is a quadruple level cell (QLC) that stores 4-bit data, the memory cell may have a threshold voltage corresponding to any one of first to sixteenth programming states P1 to P16. First to fifteenth read voltages Vd1 to Vd15 may be read voltages for distinguishing each of the first to sixteenth programming states P1 to P16. The first read voltage Vd1 may be a read voltage for distinguishing the first programming state P1 and the second programming state P2. The second read voltage Vd2 may be a read voltage for distinguishing the second programming state P2 and the third programming state P3. In the same manner, the fifteenth read voltage Vd15 may be a read voltage for distinguishing the fifteenth programming state P15 and the sixteenth programming state P16.

As a memory block has a higher bit-density, the number of programming states formed in memory cells of the memory block, and the number of read voltages for distinguishing the programming states may increase. Therefore, as a bit-density increases, a programming operation time period for forming each of the programming states may increase and a read operation time period for distinguishing the programming states may increase, to lower an access speed thereof.

When programming and erase operations are repeated in the memory block, the memory cells may be deteriorated. When the memory cells are deteriorated, it may be difficult to precisely program each of the programming states of the memory cells. In a memory block having a higher bit-density, a programming state thereof may have to be programmed more precisely. Therefore, lifespans of memory blocks with higher bit-densities may expire with fewer erase counts.

When the storage device can separately store data in memory blocks having different bit-densities based on hotness of data, access performance and a lifespan of the storage device may be improved. According to an example embodiment of the present inventive concepts, the storage device may respond to a workload pattern of the host to accurately classify data into hot data and cold data, to store the data separately into memory blocks having different bit-densities. Therefore, performance and a lifespan of the storage device may be further improved.

Hereinafter, a controller, a storage device, and a method of operating the storage device according to an example embodiment of the present inventive concepts will be described in detail with reference to FIGS. 5 to 11.

Figure 5:
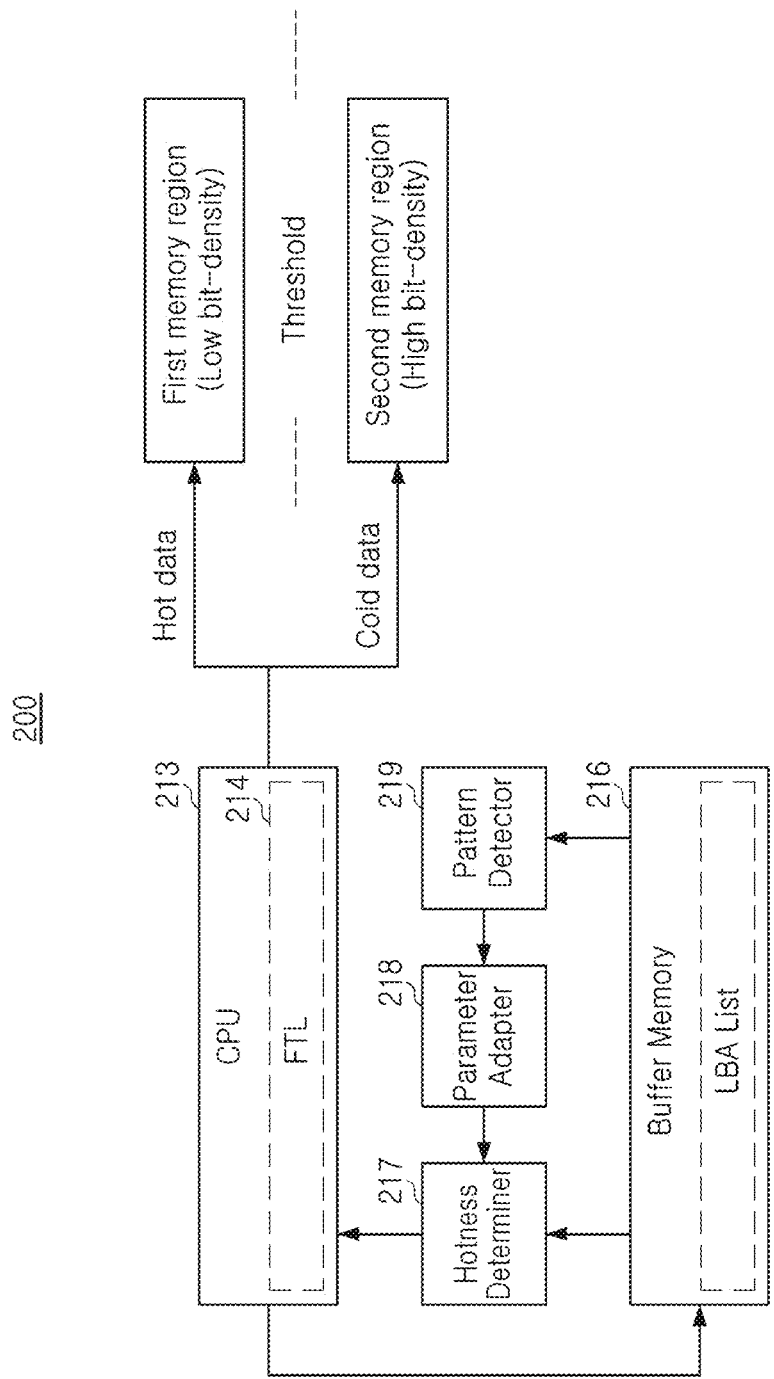
FIG. 5 illustrates some configurations of the storage device described with reference to FIG. 1.

FIG. 5 illustrates some configurations of the storage device 200 described with reference to FIG. 1. For example, a CPU 213, a flash translation layer 214, a buffer memory 216, a hotness determiner 217, a parameter adapter 218, a pattern detector 219, a first memory region, and a second memory region, in FIG. 5, may correspond to those described with reference to FIG. 1.

The first memory region may be a memory region having a relatively low bit-density, and the second memory region may be a memory region having a relatively high bit-density. For example, the first memory region may be an SLC memory region, and the second memory region may be a TLC memory region or a QLC memory region.

The CPU 213 may drive the flash translation layer 214. The flash translation layer 214 may map a logical address of data to a physical address of a non-volatile memory 220. For example, a host 100 may provide the logical address of the data, together with a write command and data to be written, to a storage device 200. The logical address may be a logical block address (LBA) used in a file system of the host 100. The flash translation layer 214 may map the logical address of the data to the first memory region or the second memory region, based on hotness determined by the hotness determiner 217. In addition, the non-volatile memory 220 may be controlled to store the data in the first memory region or the second memory region.

The buffer memory 216 may store a logical address list including a predetermined or desired number of logical addresses recently received from the host 100. The CPU 213 may insert a latest received logical address received from the host 100 into the logical address list.

The hotness determiner 217 may determine hotness of data, based on a logical address corresponding to the data. The hotness of data corresponding to the logical address may be referred to as hotness of the logical address. The hotness determiner 217 may determine hotness of the latest received logical address, with reference to the logical address list stored in the buffer memory 216 and based on a frequency and recency of a logical address having a value, equal to a value of the latest received logical address received from the host 100 and may provide the determined hotness to the flash translation layer 214.

The pattern detector 219 may determine a workload pattern of the host 100 with reference to the logical address list. For example, the pattern detector 219 may determine whether various pieces of data are received from the host 100 or small numbers of data are intensively received, based on a repeatability index of logical addresses included in the logical address list.

The parameter adapter 218 may change a parameter of the hotness determiner 217, based on the workload pattern detected by the pattern detector 219, to change a rule in which the hotness determiner 217 determines hotness of data.

The hotness determiner 217, the parameter adapter 218, and the pattern detector 219 may be implemented with a hardware circuit, separate from the CPU 213. However, the present inventive concepts are not limited thereto. For example, the hotness determiner 217, the parameter adapter 218, and the pattern detector 219 may be implemented with a firmware, may be loaded into a working memory (not illustrated), and may be driven by the CPU 213.

Hereinafter, a method of determining hotness of data according to an example embodiment of the present inventive concepts will be described in detail with reference to FIGS. 6A to 11.

Figure 6A:
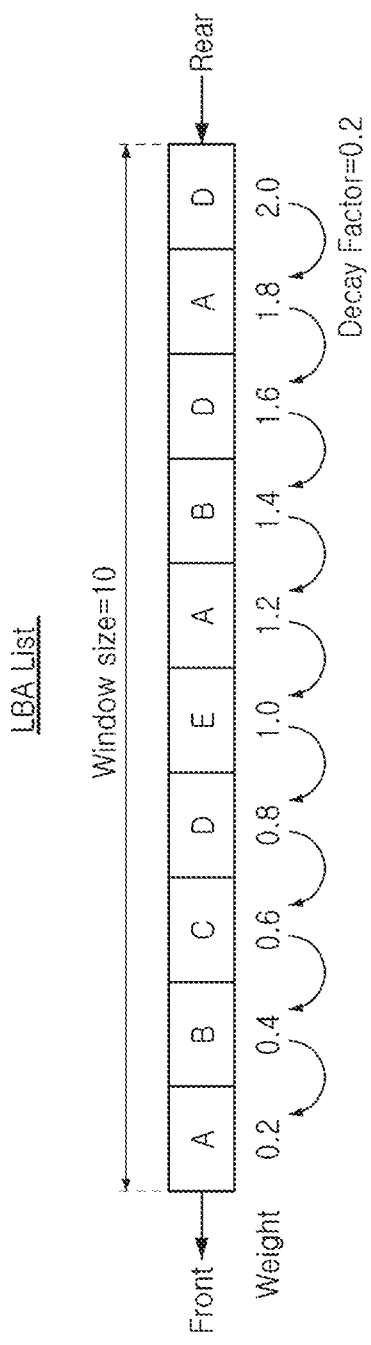
FIGS. 6A and 6B are views illustrating a logical address list for determining hotness of data.
Figure 6B:
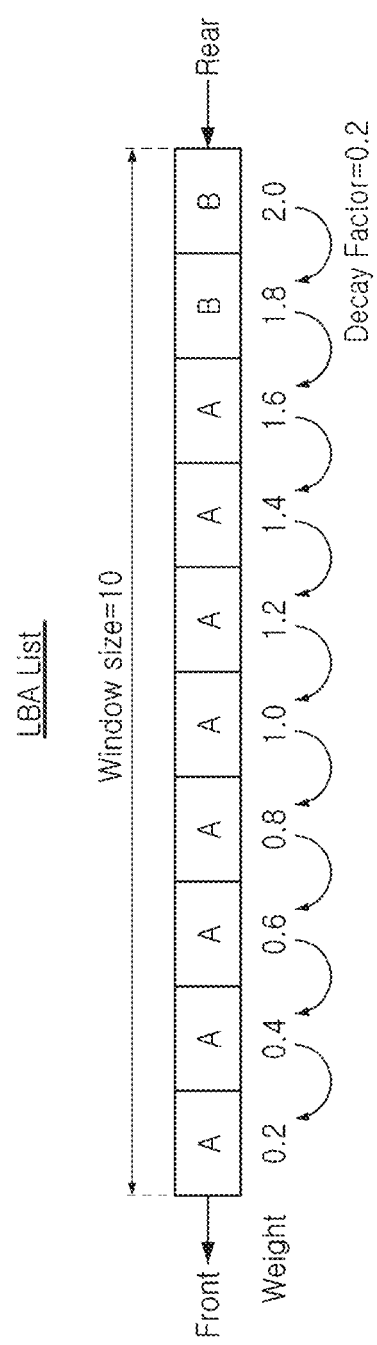

FIGS. 6A and 6B are views illustrating a logical address list for determining hotness of data.

Referring to FIG. 6A, a logical address list may be a sliding window for storing a predetermined or desired number of logical addresses recently received. Specifically, whenever a latest received logical address is received from a host 100, the latest received logical address may be inserted into the logical address list, and an oldest logical address, among existing logical addresses in the logical address list, may be released. A hotness determiner 217 may determine hotness of the latest received logical address in a relationship between the existing logical addresses, with reference to the logical address list.

In the example embodiment of FIG. 6A, a window size of the logical address list may be 10. For example, the logical address list may store ten logical addresses recently received, and the hotness determiner 217 may determine hotness of the latest received logical address, based on the ten logical addresses recently received. A, B, C, D, and E indicated in the logical address list represent different logical addresses.

The logical address list may store logical addresses recently received in sequence in which they were received. For example, when the latest received logical address is received, the latest received logical address may be inserted into a rear portion of the logical address list, and the oldest logical address among the existing logical addresses may be released to a front portion of the logical address list.

The hotness determiner 217 may count logical addresses having a value, equal to a value of the latest received logical address in the logical address list, to determine the hotness of the latest received logical address, in order to reflect a reception frequency of the logical address in the hotness of the latest received logical address. The hotness determiner 217 may assign a higher weight to a logical address recently received, when counting logical addresses, in order to further reflect recency in the hotness of the latest received logical address. For example, the hotness determiner 217 may assign a maximum weight to the latest received logical address while inserting the latest received logical address into the logical address list and may decrease weights of the existing logical addresses in the logical address list by a decay factor. In the example embodiment of FIG. 6A, the maximum weight may be 2.0 and the decay factor may be 0.2.

For example, when the hotness determiner 217 inserts a latest received logical address D into the logical address list, a maximum weight of the latest received logical address may be 2.0. In the logical address list, logical address D has been received a total of three times, and weights of logical address D may be 0.8, 1.6, and 2.0, respectively. The hotness determiner 217 may determine hotness of the latest received logical address D to be 4.4 (=0.8+1.6+2.0) and may determine data corresponding to the logical address D as hot data or cold data according to the hotness. For example, when the hotness determiner 217 determines data having a hotness of 3.9 or higher as hot data, data corresponding to the logical address D may be determined as hot data, and the logical address D may be mapped in a first memory region.

Depending on an example embodiment, a decay factor in a logical address list may be determined based on a maximum weight and a window size. Specifically, there may be a relationship of (decay factor)=(maximum weight)/(window size). The latest received logical address may have a maximum weight, a weight of the logical address may be decreased by a decay factor each time subsequent logical addresses are received, and the weight of the logical address may be 0 when the logical address is released from the list of logical addresses list. In the example embodiment of FIG. 6A, when the maximum weight is 2.0 and the window size is 10, the decay factor may be 0.2.

Referring to FIG. 6B, a window size, a maximum weight, and a decay factor of a logical address list of FIG. 6B may have values, equal to values of the window size, the maximum weight, and the decay factor of the logical address list of FIG. 6A. A pattern of logical addresses included in the logical address list of FIG. 6B may be different from that included in the logical address list of FIG. 6A.

Specifically, unlike the logical addresses A, B, C, D, and E stored in the logical address list of FIG. 6A, only logical addresses A and B may be stored in the logical address list of FIG. 6B. For example, in the example embodiment of FIG. 6A, various types of data may be received from the host, and, in the example embodiment of FIG. 6B, a small amount of data may be intensively received from a host.

Under a workload pattern in which a small number of types of data are intensively received as illustrated in FIG. 6B, even when a total number of receptions of a certain logical address is not large, when the logical address has recently started to be frequently received, there may be a higher possibility that the logical address will be received intensively in the future. Under a workload pattern in which a small number of types of data are intensively received, when a logical address that has recently started to be frequently received is selected as hot data and data corresponding to the logical address is stored in a first memory region, performance of a storage device may be improved, and a lifespan of a second memory region may be improved.

According to an example embodiment of the present inventive concepts, a storage device may adjust a parameter such as a window size, a decay factor, or the like, based on a workload pattern from a host. When the storage device adjusts the parameter according to the workload pattern, a rule for determining hotness of logical addresses included in a logical address list may be changed.

For example, in the example embodiment of FIG. 6B, hotness of the logical address B may be determined to be 3.8 (=1.8+2.0), and since the hotness has a value smaller than a threshold value of 3.9, the logical address B may be determined as cold data. Since FIG. 6A has a workload pattern in which various logical addresses are received, it may not be determined that a logical address will be received frequently in the future, even when the logical address has been continuously received twice recently. Since FIG. 6B has a workload pattern in which a small number of types of logical addresses are intensively received, when logical addresses B have been continuously received recently, there may be a higher probability that logical addresses B will be received in the future. Therefore, under a workload pattern in which a small number of types of logical addresses are intensively received, the storage device may upwardly adjust weights of logical addresses recently received, to determine the logical addresses as hot data, even though the logical addresses have not been received many times.

Figure 7:
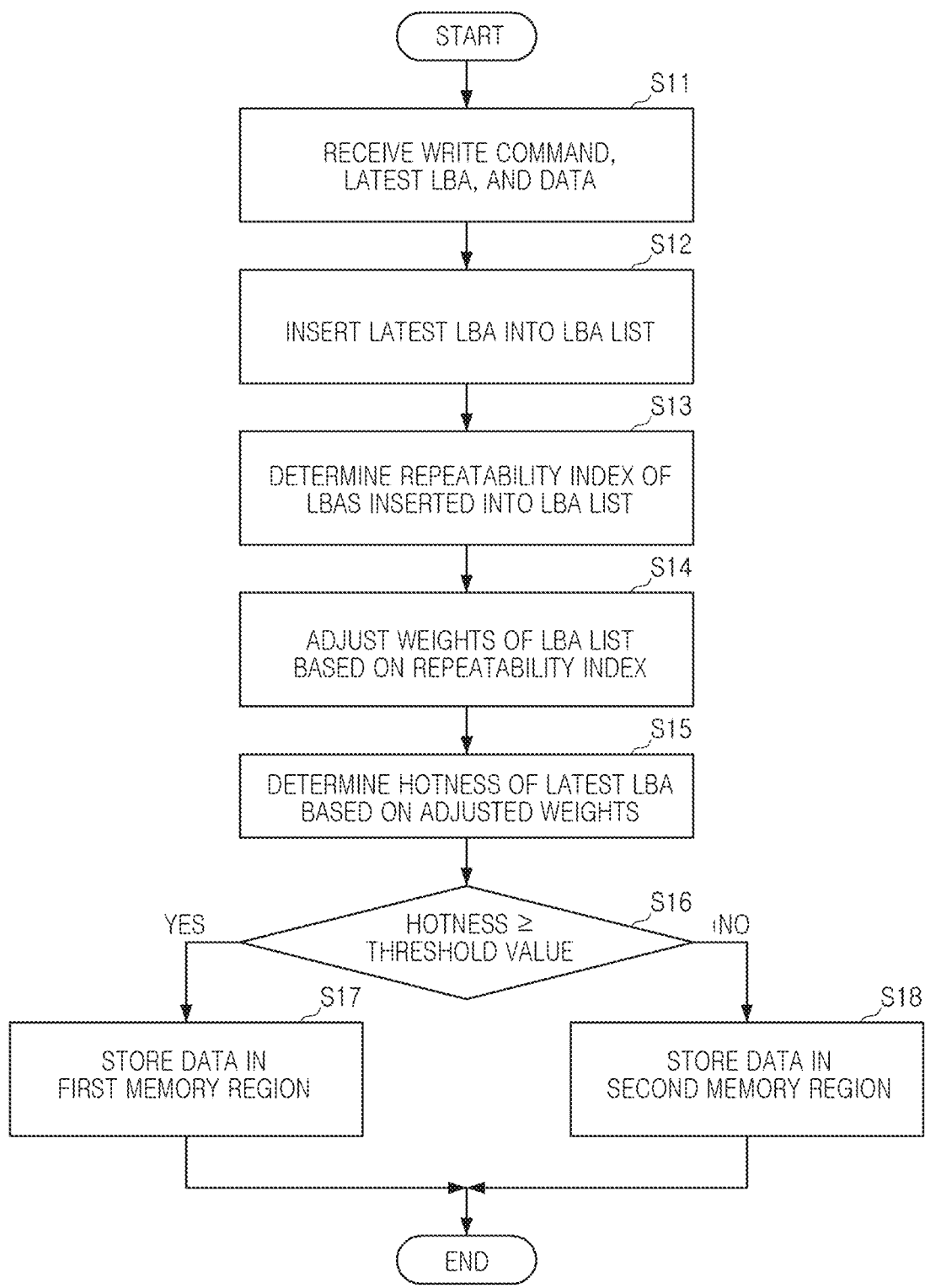
FIG. 7 is a flowchart illustrating a method of operating a storage device according to an example embodiment of the present inventive concepts.

FIG. 7 is a flowchart illustrating a method of operating a storage device according to an example embodiment of the present inventive concepts.

In S11, a storage device may receive a write command, data to be written, and a latest received logical address corresponding to the data, from a host.

In S12, the storage device may insert the latest received logical address into a logical address list. As described with reference to FIG. 6A, when the latest received logical address is inserted into the logical address list, an oldest logical address among existing logical addresses stored in the logical address list may be released.

In S13, the storage device may determine a repeatability index of the logical addresses inserted into the logical address list. The repeatability index may indicate whether a workload pattern of the host is a pattern in which various pieces of data are received or a pattern in which small amounts of data are repeatedly received. The repeatability index may be determined based on logical addresses stored in the logical address list. A specific example of a method of determining the repeatability index will be described later with reference to FIGS. 8A and 8B.

In S14, the storage device may adjust weights of the logical addresses included in the logical address list based on the repeatability index. For example, the storage device may increase the weights when the repeatability index is equal to or higher than a threshold value. A specific example of a method of upwardly adjusting the weights may be described with reference to FIGS. 9 to 11.

In S15, the storage device may determine hotness of the latest received logical address based on the adjusted weights. An example of a method of determining hotness of the latest received logical address based on the weights has been described with reference to FIGS. 6A and 6B.

In S16, the storage device may determine whether the determined hotness is equal to or higher than a threshold value.

When the hotness is equal to or greater than the threshold value (YES in S16), the storage device may determine data to be written as hot data in S17 and may store the data in a first memory region having a relatively high bit-density.

When the hotness is lower than the threshold value (NO in S16), the storage device may determine data to be written as cold data in S18 and may store the data in a second memory region having a relatively low bit-density.

Figure 8A:
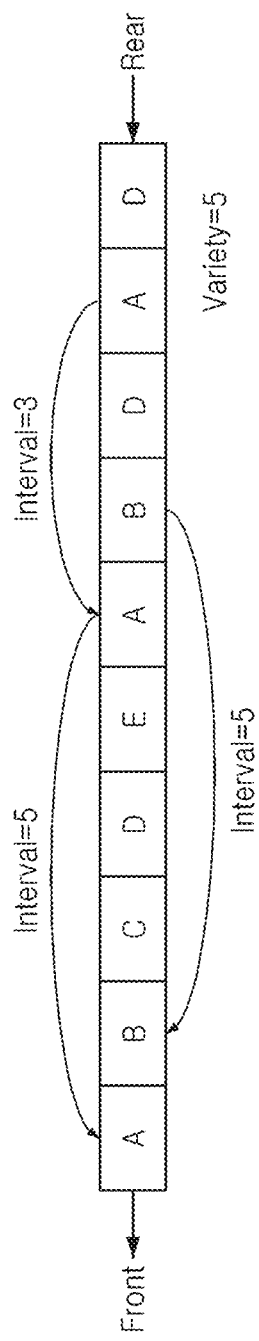
FIGS. 8A and 8B are views illustrating a method for a storage device to determine a repeatability index.
Figure 8B:
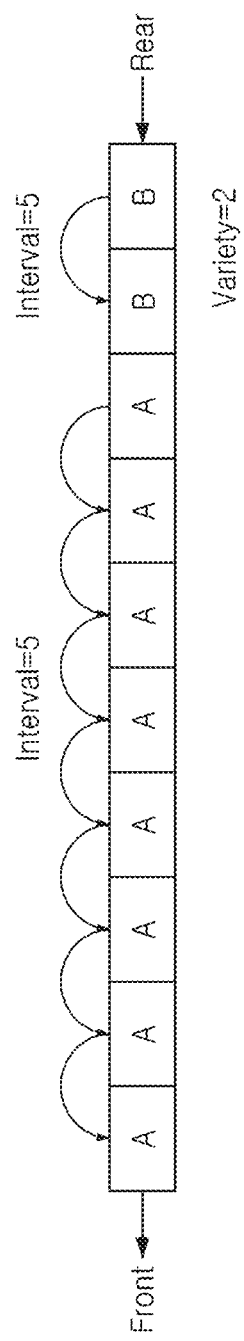

FIGS. 8A and 8B are views illustrating a method for a storage device to determine a repeatability index.

FIG. 8A illustrates a logical address list having a pattern in which various logical addresses are received, like the logical address list illustrated in FIG. 6A. Also, FIG. 8B illustrates a logical address list having a pattern in which a small number of types of logical addresses are repeatedly received, like the logical address list illustrated in FIG. 6B. In the logical address list of FIG. 8A and the logical address list of FIG. 8B, a repeatability index may be determined as different values.

According to an example embodiment, a storage device may determine a repeatability index of logical addresses included in a logical address list, based on variety of the logical addresses.

Referring to FIG. 8A, logical addresses A, B, C, D, and E may be included in a logical address list. Since the five types of logical addresses are included in the logical address list, variety may be determined as '5' in the example embodiment of FIG. 8A. Referring to FIG. 8B, since two types of logical addresses, A and B, may be included in a logical address list, variety may be determined as '2' in the example embodiment of FIG. 8B. A storage device may determine a repeatability index to have a higher value, as variety of logical addresses is lowered. For example, a repeatability index in the logical address list of FIG. 8B may be determined to be a higher value than a repeatability index in the logical address list of FIG. 8A.

According to an example embodiment, a storage device may determine a repeatability index of logical addresses included in a logical address list, based on a cycle in which each of the logical addresses is received.

FIG. 8A illustrates intervals at which logical addresses A and B are respectively received. Logical addresses A may have been received at an interval of 5 and an interval of 3 in the logical address list. For example, the logical address A may be received at an interval of 4 on average. Logical addresses B may have been received at an interval of 5 in the logical address list. Although omitted from the drawing, logical addresses D may be received at an interval of 3 and an interval of 2, and logical addresses C and E may be received once. The storage device may determine an average interval at which each of the logical addresses is received, based on an interval at which the logical addresses are received. For example, the storage device may determine an average receiving interval for all or some of the logical addresses included in the logical address list.

FIG. 8B illustrates intervals at which logical addresses A and B included in the logical address list are respectively received. Logical addresses A may have been received consecutively in the logical address list, e.g., at an interval of 1, and logical addresses B may have been received at an interval of 1. For example, in the example embodiment of FIG. 8B, each of the logical addresses may be received an interval of 1.

The storage device may determine a repeatability index to have a higher value, as an average interval during which logical addresses are received is shorter. For example, in FIG. 8B, an average interval in which logical addresses are received may be shorter, and a repeatability index may be determined to be a higher value.

Figure 9:
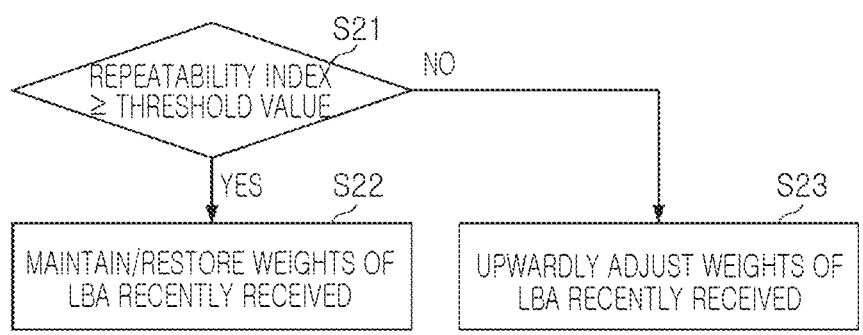
FIG. 9 is a flowchart illustrating a method for a storage device to adjust weights of logical addresses based on a repeatability index.

FIG. 9 is a flowchart illustrating a method for a storage device to adjust weights of logical addresses based on a repeatability index.

In S21, a storage device may determine whether a repeatability index of logical addresses is equal to or higher than a threshold value.

When the repeatability index is equal to or greater than the threshold value (YES in S21), the storage device may maintain or restore parameters related to a logical address list to original values thereof in S22, to set weights of logical addresses recently received, as the original values.

When the repeatability index is lower than the threshold value (NO in S21), the storage device may adjust parameters related to a logical address list in S23, to upwardly adjust weights of logical addresses recently received. For example, an original weight may be the weight described in the logical address list of FIGS. 6A and 6B, and the upwardly adjusted weights may be described with reference to FIGS. 10 to 11.

Figure 10:
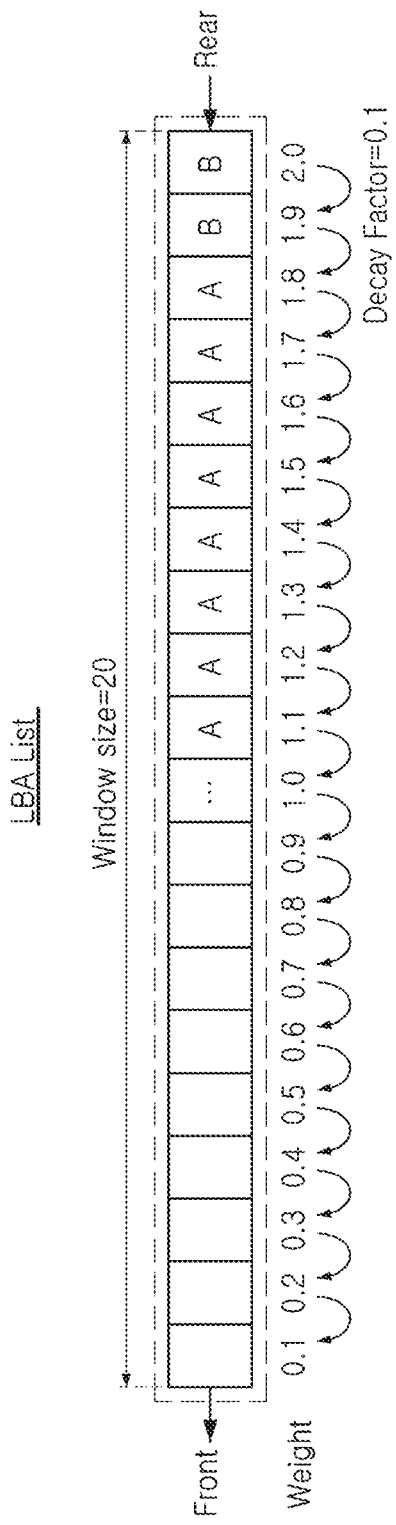
FIGS. 10 and 11 are views illustrating an example of adjusting parameters in order to upwardly adjust weights of logical addresses.

FIG. 10 is a view illustrating a first example of adjusting parameters in order to upwardly adjust weights of logical addresses.

FIG. 10 illustrates a logical address list. A storage device may increase a window size of the logical address list. With the increase of the window size, the storage device may decrease a value of a decay factor, to monotonically decrease weights of existing logical addresses from a maximum weight such that a weight when logical addresses are released becomes 0. For example, the storage device may increase the window size from 10 to 20 and may decrease the decay factor from 0.2 to 0.1. Comparing FIGS. 6A, 6B, and 10, weights of logical addresses in FIGS. 6A and 6B may be reduced in sequence of '2.0', '1.8', '1.6', . . . , and weights of logical addresses in FIG. 10 may be in sequence of '2.0', '1.9', '1.8', . . . . For example, weights of logical addresses recently received may be upwardly adjusted.

According to an example embodiment of the present inventive concepts, under a workload pattern in which small numbers of logical addresses are intensively received, the storage device may determine hotness of a latest received logical address, based on weights of logical addresses upwardly adjusted according to adjustment of a parameter. When weights of logical addresses are upwardly adjusted, hotnesses of logical addresses quickly reach a threshold value, when the logical addresses are repeatedly received. As a result, the storage device may classify the logical addresses as hot data in response to a change in a workload pattern of a host.

For example, hotness of logical address B received twice continuously in FIG. 10 may be determined to be 3.9 (=1.9+2.0). Comparing FIGS. 6B and 10, since hotness of logical address B in FIG. 6B, having a high possibility of being frequently accessed in the future, may be determined to be 3.8, data corresponding to the logical address B may be difficult to be classified as hot data. Since hotness of logical address B in FIG. 10 may be determined to be 3.9, the data may be classified as hot data. Therefore, according to the example embodiment described with reference to FIG. 10, the logical address B, having a high possibility of being frequently accessed in the future, may be successfully classified as hot data.

Figure 11:
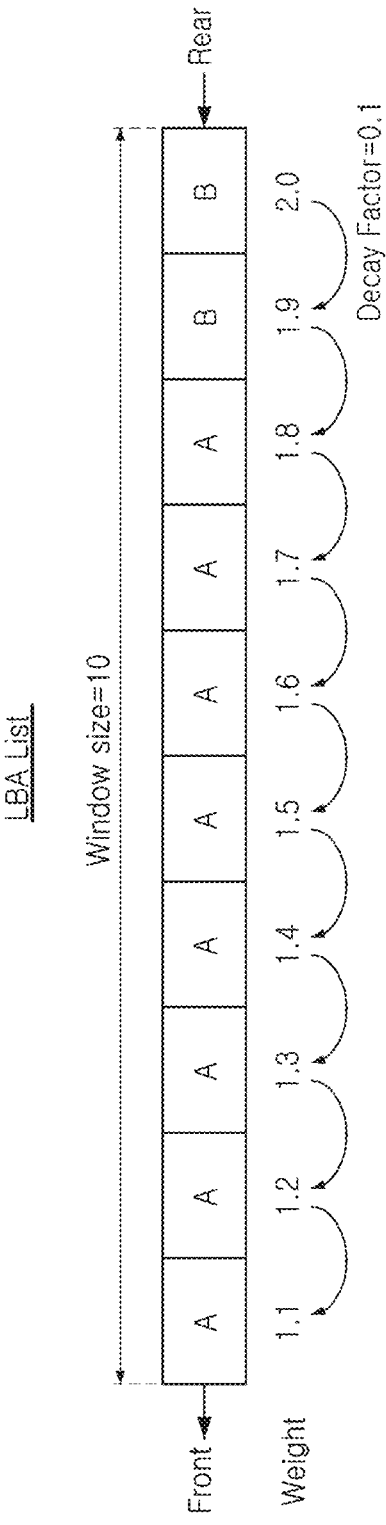

FIG. 11 is a view illustrating a second example of adjusting parameters in order to upwardly adjust weights of logical addresses.

FIG. 11 illustrates a logical address list. A storage device may reduce a value of a decay factor of the logical address list and may maintain a window size. Specifically, the storage device may reduce only the decay factor to '0.1' while maintaining the window size at '10.' In the example embodiment of FIG. 11, weights of logical addresses may be reduced in sequence of '2.0', '1.9', '1.8', . . . to reach '1.1.'

Even in FIG. 11, as described with reference to FIG. 10, weights of logical addresses recently received may be upwardly adjusted. Therefore, in a pattern in which small amounts of data are repeatedly received, a logical address that starts to be repeatedly received may be classified as hot data.

According to an example embodiment of the present inventive concepts, the storage device may determine a repeatability index of logical addresses, based on a workload pattern of a host, and may adjust a weight of logical addresses recently received, based on the repeatability index, to accurately classify hot data and cold data. Therefore, since hot data and cold data may be accurately separated and stored in a first memory region or a second memory region, performance and a lifespan of the storage device may be improved.

As described with reference to FIGS. 1 to 11, the present inventive concepts may be applied to a case in which a storage device may include two memory regions having two types of bit-densities and may separately store hot data and cold data in the memory regions. However, the present inventive concepts are not limited thereto. For example, the present inventive concepts may also be applied to a case in which a storage device may include three or more memory regions having different bit-densities and may separately store hot data, warm data, cold data, and the like in the memory regions.

Figure 12:
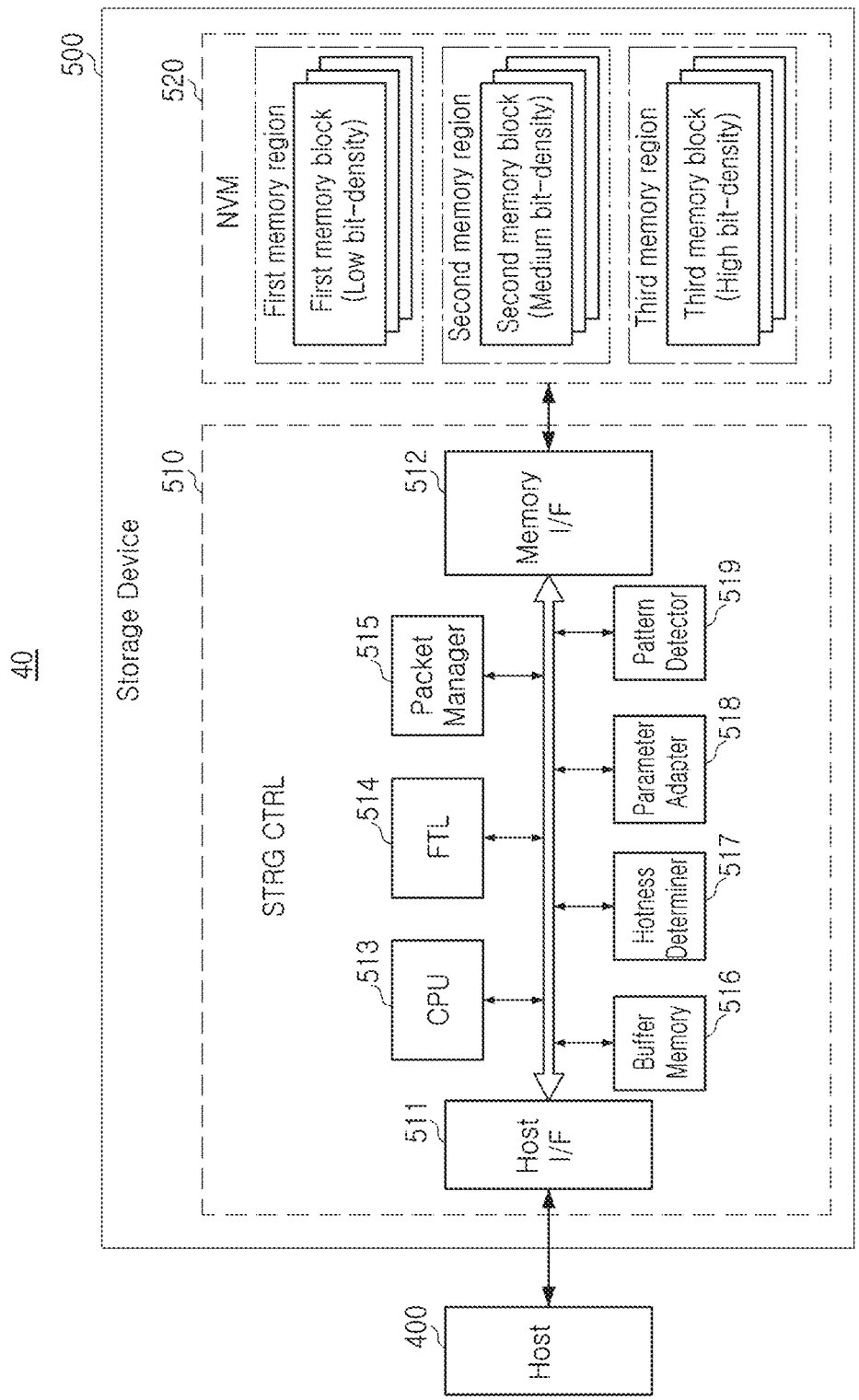
FIG. 12 illustrates a host-storage system according to an example embodiment of the present inventive concepts.

FIG. 12 illustrates a host-storage system 40 according to an example embodiment of the present inventive concepts.

A host-storage system 40 may include a host 400 and a storage device 500. Also, the storage device 500 may include a storage controller 510 and a non-volatile memory (NVM) 520.

The host 400 may include an operating system that generally manages and controls functions and operations of the host 400, similarly to the host 100 described with reference to FIG. 1. Also, in a similar manner to the storage device 200 described with reference to FIG. 1, the storage device 500 may include storage media for storing data according to a request from the host 400.

The storage controller 510 may include a host interface 511, a memory interface 512, and a CPU 513. In addition, the storage controller 510 may further include a flash translation layer 514, a packet manager 515, a buffer memory 516, a hotness determiner 517, a parameter adapter 518, and a pattern detector 519. Components included in the storage controller 510 may operate similarly to components included in the storage controller 210 described with reference to FIG. 1.

The non-volatile memory 520 may maintain stored data even when power is not supplied. The non-volatile memory 520 may store data provided from the host 400 in a programming operation and may output the data stored in the non-volatile memory 520 in a read operation. The non-volatile memory 520 may include a plurality of memory blocks, each of which may include a plurality of pages, and each of the pages may include a plurality of memory cells connected to a word line.

The non-volatile memory 520 may include first to third memory regions having different bit-densities. Specifically, the first memory region may have a lowest bit-density, the second memory region may have a medium bit-density, and the third memory region may have a highest bit-density. For example, the first memory region may be an SLC memory region, the second memory region may be a TLC memory region, and the third memory region may be a QLC memory region.

The storage controller 510 may classify data from the host 400 into hot data, warm data, and cold data according to hotness, and may store the data in first to third memory regions, respectively. According to an example embodiment of the present inventive concepts, the storage device 500 may determine whether a workload pattern of the host 400 is a pattern in which various pieces of data are received or a pattern in which small amounts of data are repeatedly received and may adjust a parameter for determining hotness according to the workload pattern of the host 400, accurately classify data by quickly adapting to a changing workload pattern of the host 400. Therefore, performance and a lifespan of memory regions storing classified data may be improved.

Figure 13:
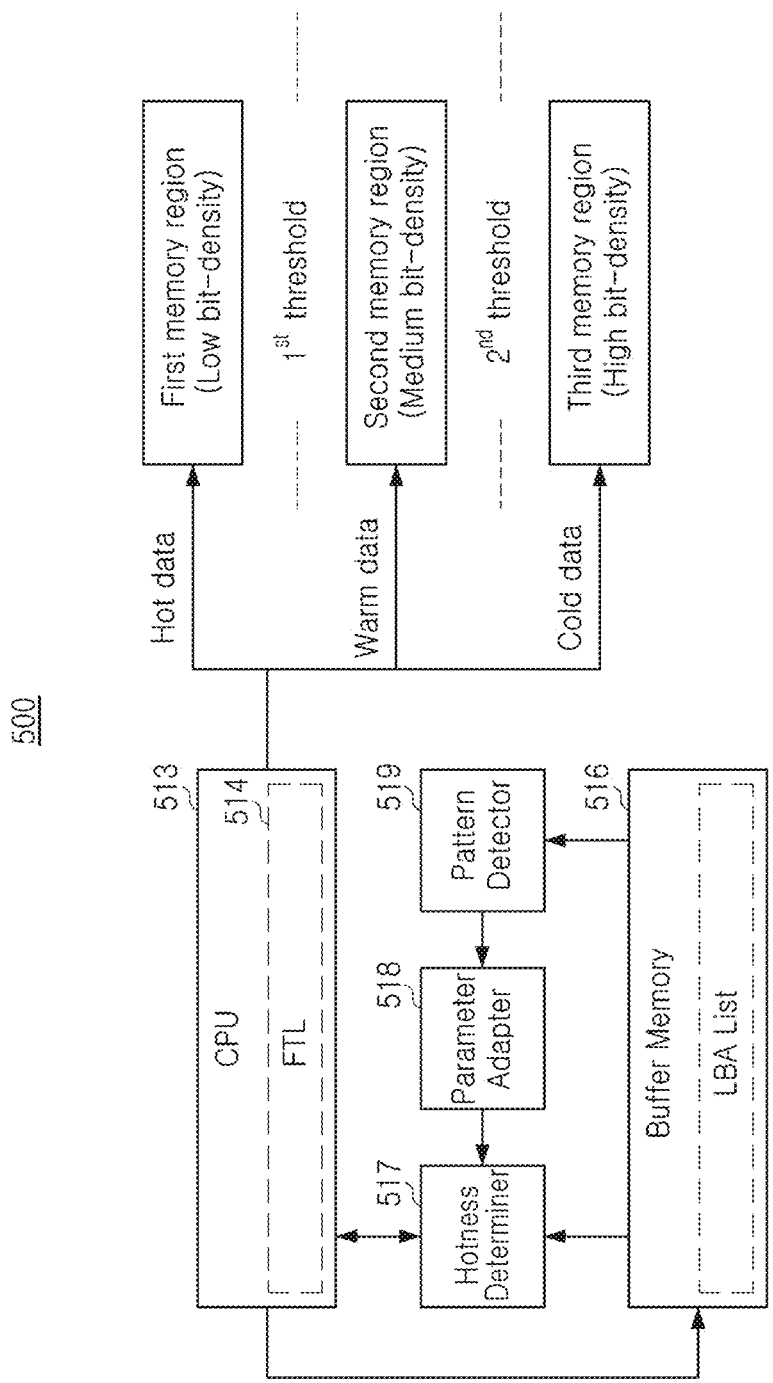
FIG. 13 illustrates a partial configuration of a storage device according to an example embodiment of the present inventive concepts.

FIG. 13 illustrates a partial configuration of a storage device 500 according to an example embodiment of the present inventive concepts. For example, a CPU 513, a buffer memory 516, a hotness determiner 517, a parameter adapter 518, a pattern detector 519, a first memory region, and a second memory region, in FIG. 5, may correspond to those described with reference to FIG. 12.

The CPU 513 may drive a flash translation layer 514 to map a logical address of data to one of the first to third memory regions.

The buffer memory 516 may store a logical address list including a predetermined or desired number of logical addresses recently received.

The hotness determiner 517 may determine hotness of data, based on a logical address corresponding to the data. The hotness determiner 517 may determine data corresponding to the logical address as hot data when hotness is equal to or greater than a first threshold value, may determine the data as warm data when hotness is less than the first threshold value and equal to or greater than a second threshold value, and may determine the data as cold data when hotness is less than the second threshold value. A method for the hotness determiner 517 to determine hotness of data may be the same as those described with reference to FIGS. 6A and 6B.

The pattern detector 519 may determine a workload pattern of the host 400 with reference to the logical address list. For example, the pattern detector 519 may determine whether various pieces of data are received from the host 400 or small numbers of data are intensively received, based on variety or repeatability of logical addresses included in the logical address list.

The parameter adapter 518 may change a parameter of the hotness determiner 517, based on the workload pattern detected by the pattern detector 519, to change a rule in which the hotness determiner 517 determines hotness of data. A method for the parameter adapter 518 to change the parameter of the hotness determiner 517 may be the same as those described with reference to FIGS. 9 to 11.

According to an example embodiment of the present inventive concepts, the storage device may quickly adapt to a changing workload pattern of a host to accurately determine hotness of data received from the host and may separately store data in memory regions having different bit-densities. Therefore, performance and a lifespan of the storage device may be improved.

Hereinafter, a structure of a memory device to which the present inventive concepts may be applied, and an example of a system to which the present inventive concepts may be applied will be described with reference to FIGS. 14 to 15.

Figure 14:
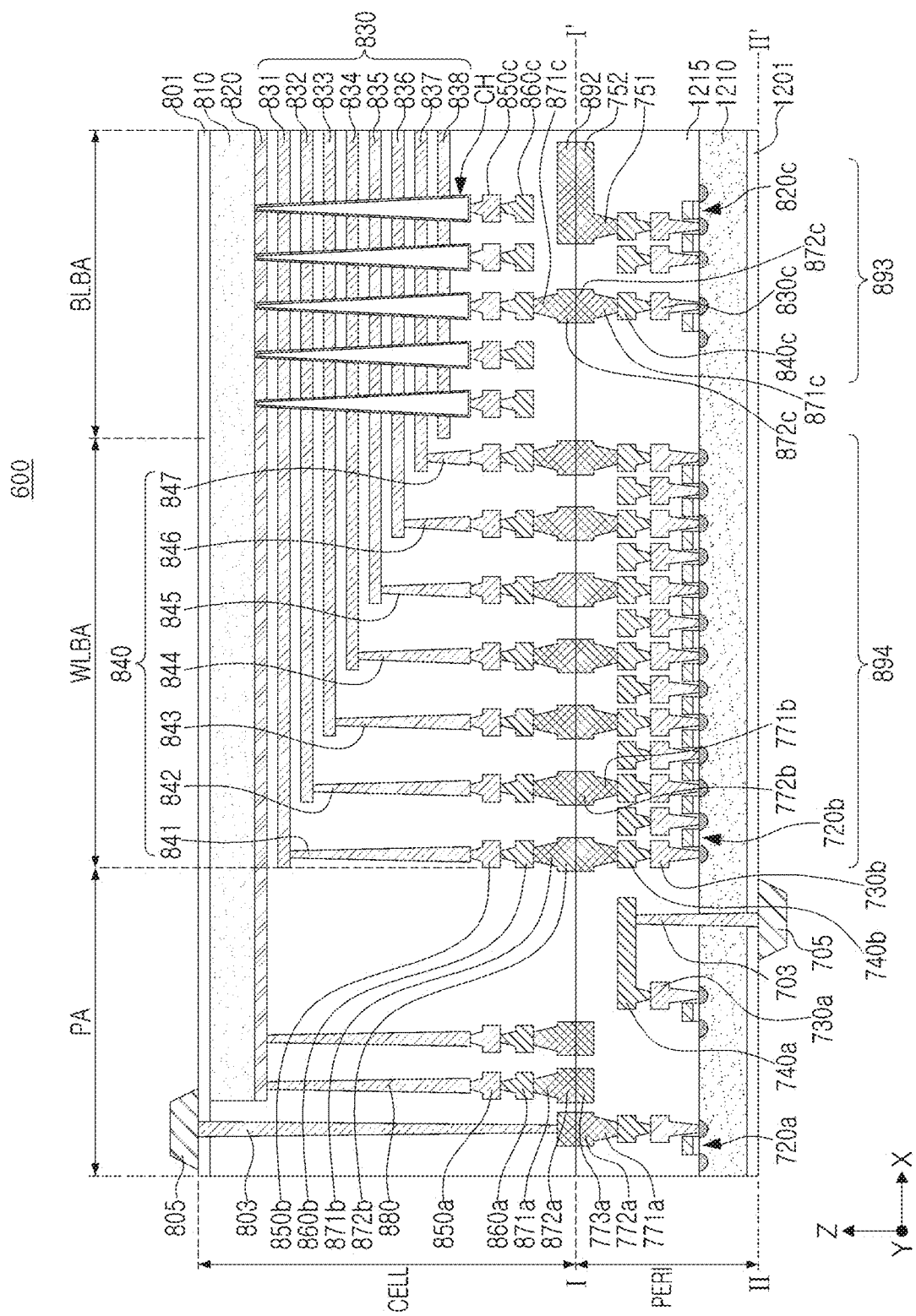
FIG. 14 is a cross-sectional view illustrating a memory device according to an example embodiment of the present inventive concepts.

FIG. 14 is a cross-sectional view illustrating a memory device according to an example embodiment of the present inventive concepts.

Referring to FIG. 14, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then bonding the upper chip and the lower chip to each other by a bonding process. For example, the bonding process may refer to a method of electrically connecting a bonding metal formed on an uppermost metal layer of the upper chip and a bonding metal formed on an uppermost metal layer of the lower chip. For example, when the bonding metal is formed of copper (Cu), the bonding method may be a Cu—Cu bonding method, and the bonding metal may also be formed of aluminum or tungsten.

Each of the peripheral circuit region PERI and the cell region CELL of the memory device 600 may include an external pad bonding area PA, a word line bonding area WLBA, and a bit line bonding area BLBA. The peripheral circuit region PERI may include a first substrate 710, an interlayer insulating layer 715, a plurality of circuit elements 720*a*, 720*b*, and 720*c* formed on the first substrate 710, first metal layers 730*a*, 730*b*, and 730*c* respectively connected to the plurality of circuit elements 720*a*, 720*b*, and 720*c*, and second metal layers 740*a*, 740*b*, and 740*c* formed on the first metal layers 730*a*, 730*b*, and 730*c*. In an example embodiment, the first metal layers 730*a*, 730*b*, and 730*c* may be formed of tungsten having relatively high electrical resistivity, and the second metal layers 740*a*, 740*b*, and 740*c* may be formed of copper having relatively low electrical resistivity.

In this specification, only the first metal layers 730*a*, 730*b*, 730*c* and the second metal layers 740*a*, 740*b*, and 740*c* are illustrated and described, but not limited thereto, and at least one or more metal layers may be further formed on the second metal layers 740*a*, 740*b*, and 740*c*. At least a portion of the one or more metal layers formed on the second metal layers 740*a*, 740*b*, and 740*c* may be formed of aluminum or the like having a lower resistance than copper forming the second metal layers 740*a*, 740*b*, and 740*c*.

The interlayer insulating layer 715 may be disposed on the first substrate 710 and cover the plurality of circuit elements 720*a*, 720*b*, and 720*c*, the first metal layers 730*a*, 730*b*, and 730*c*, and the second metal layers 740*a*, 740*b*, and 740*c*. The interlayer insulating layer 715 may include an insulating material such as silicon oxide, silicon nitride, or the like.

Lower bonding metals 771*b* and 772*b* may be formed on the second metal layer 740*b* in the word line bonding area WLBA. In the word line bonding area WLBA, the lower bonding metals 771*b* and 772*b* in the peripheral circuit region PERI may be electrically bonded to upper bonding metals 871*b* and 872*b* of the cell region CELL. The lower bonding metals 771*b* and 772*b* and the upper bonding metals 871*b* and 872*b* may be formed of aluminum, copper, tungsten, or the like. The upper bonding metals 871*b* and 872*b* of the cell region CELL may be referred to as first metals, and the lower bonding metals 771*b* and 772*b* of the peripheral circuit region PERI may be referred to as second metals.

The cell region CELL may include at least one memory block. The cell region CELL may include a second substrate 810 and a common source line 820. On the second substrate 810, a plurality of word lines 831 to 838 (i.e., 830) may be stacked in a direction (the Z-axis direction), perpendicular to an upper surface of the second substrate 810. A string select line and a ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction (the Z-axis direction), perpendicular to the upper surface of the second substrate 810, and pass through the plurality of word lines 830, the string select line, and the ground select line. The channel structure CH may include a data storage layer, a channel layer, a buried insulating layer, and the like, and the channel layer may be electrically connected to a first metal layer 850*c* and a second metal layer 860*c*. For example, the first metal layer 850*c* may be a bit line contact, and the second metal layer 860*c* may be a bit line. In an example embodiment, the bit line may extend in the first direction (the Y-axis direction), parallel to the upper surface of the second substrate 810.

In the example embodiment illustrated in FIG. 14, an area in which the channel structure CH, the bit line 860*c*, and the like are disposed may be defined as the bit line bonding area BLBA. In the bit line bonding area BLBA, the bit line may be electrically connected to the circuit elements 720*c* providing a page buffer 893 in the peripheral circuit region PERI. The bit line 860*c* may be connected to upper bonding metals 871*c* and 872*c* in the cell region CELL, and the upper bonding metals 871*c* and 872*c* may be connected to lower bonding metals 771*c* and 772*c* connected to the circuit elements 720*c* of the page buffer 893.

In the word line bonding area WLBA, the word lines 830 may extend in a second direction (an X-axis direction), parallel to the upper surface of the second substrate 810 and perpendicular to the first direction and may be connected to a plurality of cell contact plugs 841 to 847 (i.e., 840). The plurality of word lines 830 and the plurality of cell contact plugs 840 may be connected to each other in pads provided by at least a portion of the plurality of word lines 830 extending in different lengths in the second direction. A first metal layer 850*b* and a second metal layer 860*b* may be connected to an upper portion of the plurality of cell contact plugs 840 connected to the plurality of word lines 830, sequentially. The plurality of cell contact plugs 840 may be connected to the peripheral circuit region PERI by the upper bonding metals 871*b* and 872*b* of the cell region CELL and the lower bonding metals 771*b* and 772*b* of the peripheral circuit region PERI in the word line bonding area WLBA.

The plurality of cell contact plugs 840 may be electrically connected to the circuit elements 720*b* forming a row decoder 894 in the peripheral circuit region PERI. In an example embodiment, operating voltages of the circuit elements 720*b* of the row decoder 894 may be different than operating voltages of the circuit elements 720*c* forming the page buffer 893. For example, operating voltages of the circuit elements 720*c* forming the page buffer 893 may be greater than operating voltages of the circuit elements 720*b* forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850*a* and a second metal layer 860*a* may be stacked on an upper portion of the common source line contact plug 880, sequentially. For example, an area in which the common source line contact plug 880, the first metal layer 850*a*, and the second metal layer 860*a* are disposed may be defined as the external pad bonding area PA.

Input/output pads 705 and 805 may be disposed in the external pad bonding area PA. Referring to FIG. 14, a lower insulating film 701 covering a lower surface of the first substrate 710 may be formed below the first substrate 710, and a first input/output pad 705 may be formed on the lower insulating film 701. The first input/output pad 705 may be connected to at least one of the plurality of circuit elements 720*a*, 720*b*, and 720*c* disposed in the peripheral circuit region PERI through a first input/output contact plug 703 and may be separated from the first substrate 710 by the lower insulating film 701. In addition, a side insulating film may be disposed between the first input/output contact plug 703 and the first substrate 710 to electrically separate the first input/output contact plug 703 and the first substrate 710.

Referring to FIG. 14, an upper insulating film 801 covering the upper surface of the second substrate 810 may be formed on the second substrate 810, and a second input/output pad 805 may be disposed on the upper insulating layer 801. The second input/output pad 805 may be connected to at least one of the plurality of circuit elements

720a, 720b, and 720c disposed in the peripheral circuit region PERI through a second input/output contact plug 803.

In some example embodiments, the second substrate 810 and the common source line 820 may not be disposed in a region in which the second input/output contact plug 803 is disposed. Also, the second input/output pad 805 may not overlap the word lines 830 in the third direction (the Z-axis direction). Referring to FIG. 14, the second input/output contact plug 803 may be separated from the second substrate 810 in a direction, parallel to the upper surface of the second substrate 810 and may pass through an interlayer insulating layer 815 of the cell region CELL to be connected to the second input/output pad 805.

In some example embodiments, the first input/output pad 705 and the second input/output pad 805 may be selectively formed. For example, the memory device 600 may include only the first input/output pad 705 disposed on the first substrate 710 or may include only the second input/output pad 805 disposed on the second substrate 810. Alternatively, the memory device 600 may include both the first input/output pad 705 and the second input/output pad 805.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 600 may include a lower metal pattern 773a, corresponding to an upper metal pattern 872a formed in an uppermost metal layer of the cell region CELL, and having the same cross-sectional shape as the upper metal pattern 872a of the cell region CELL so as to be connected to each other, in an uppermost metal layer of the peripheral circuit region PERI. In the peripheral circuit region PERI, the lower metal pattern 773a formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as the lower metal pattern of the peripheral circuit region PERI, may be formed in an uppermost metal layer of the cell region CELL.

The lower bonding metals 771b and 772b may be formed on the second metal layer 740b in the word line bonding area WLBA. In the word line bonding area WLBA, the lower bonding metals 771b and 772b of the peripheral circuit region PERI may be electrically connected to the upper bonding metals 871b and 872b of the cell region CELL by bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In the example embodiment, a reinforced metal pattern, corresponding to a metal pattern formed on the uppermost metal layer of one of the cell region CELL and the peripheral circuit region PERI, and having the same cross-sectional shape as a metal pattern formed on the uppermost metal layer of the other one of the cell region CELL and the peripheral circuit region PERI, may be formed. A contact may not be formed in the reinforced metal pattern.

The memory device 600 may include memory regions having different bit-densities according to the number of bits stored in memory cells. Data received from a host may be stored separately in the memory regions having different bit-densities according to attributes. According to an example embodiment of the present inventive concepts, hot data and cold data may be accurately divided and stored in memory blocks under a changing workload pattern of the host. Therefore, write amplification of the memory device 600 may be reduced, and a lifespan may be improved.

Figure 15:
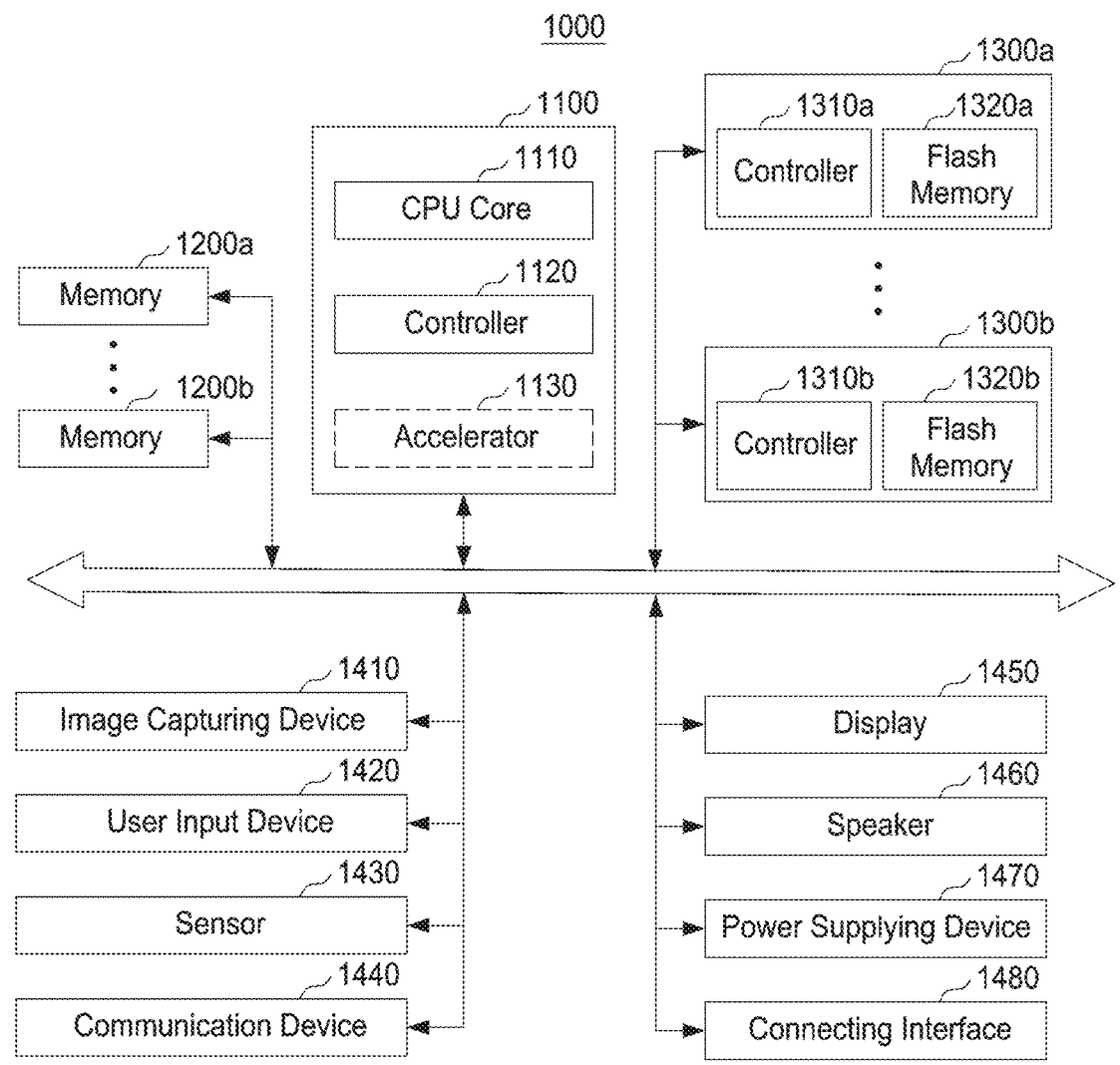
FIG. 15 is a view illustrating a system to which a storage device according to an example embodiment of the present inventive concepts are applied.

FIG. 15 is a view illustrating a system 1000 to which a storage device according to an example embodiment of the present inventive concepts are applied. The system 1000 of FIG. 15 may be basically a mobile system, such as a mobile phone, a smartphone, a tablet personal computer (PC), a wearable device, a healthcare device, or an internet-of-things (IOT) device. The system 1000 of FIG. 15 is not necessarily limited to the mobile system and may be for a vehicle such as a personal computer, a laptop computer, a server, a media player, an automotive device such as a navigation system, or the like.

Referring to FIG. 15, the system 1000 may include a main processor 1100, memories 1200a and 1200b, and storage devices 1300a and 1300b, and may further include at least one of an image capturing device 1410, a user input device 1420, a sensor 1430, a communication device 1440, a display 1450, a speaker 1460, a power supplying device 1470, or a connecting interface 1480.

The main processor 1100 may control an overall operation of the system 1000, and more specifically, operations of other components constituting the system 1000. The main processor 1100 may be implemented as a general-purpose processor, a dedicated processor, an application processor, or the like.

The main processor 1100 may include at least one CPU core 1110 and may further include a controller 1120 for controlling the memories 1200a and 1200b and/or the storage devices 1300a and 1300b. According to an example embodiment, the main processor 1100 may further include an accelerator 1130 that may be a dedicated circuit for high-speed data operation such as artificial intelligence (AI) data operation or the like. The accelerator 1130 may include a graphics processing unit (GPU), a neural processing unit (NPU), and/or a data processing unit (DPU), or the like, and may be implemented as a separate chip, physically independent from other components of the main processor 1100.

The memories 1200a and 1200b may be used as a main memory device of the system 1000 and may include volatile memories such as SRAM and/or DRAM, or the like, but may also include non-volatile memories such as flash memory, PRAM, and/or RRAM, or the like. The memories 1200a and 1200b may be implemented together with the main processor 1100 in the same package.

The storage devices 1300a and 1300b may function as non-volatile storage devices that store data regardless of whether power is supplied or not, and may have a relatively larger storage capacity, as compared to the memories 1200a and 1200b. The storage devices 1300a and 1300b may include storage controllers 1310a and 1310b, and non-volatile memories (NVM) 1320a and 1320b for storing data under control of the storage controllers 1310a and 1310b. The non-volatile memories 1320a and 1320b may include a flash memory having a 2D (2-dimensional) structure or a 3D (3-dimensional) vertical NAND (V-NAND) structure but may include other types of non-volatile memory such as PRAM and/or RRAM, or the like.

The storage devices 1300a and 1300b may be included in the system 1000 in a state physically separated from the main processor 1100 or may be implemented together with the main processor 1100 in the same package. In addition, the storage devices 1300a and 1300b may have a shape such as a solid state device (SSD) or a memory card, to be detachably coupled to other components of the system 1000 through an interface such as a connecting interface 1480 to be described later. Such storage devices 1300a and 1300b may be devices to which standard protocols such as a universal flash storage (UFS), an embedded multi-media card (eMMC), or a non-volatile memory express (NVMe) are applied, but the present inventive concepts are not necessarily limited thereto.

The storage devices 1300a and 1300b according to an example embodiment of the present inventive concepts may include memory regions having different bit-densities. The storage devices 1300a and 1300b may provide an improved lifespan by dynamically adjusting the sizes of memory regions using reinforcement learning.

The image capturing device 1410 may capture a still image or a moving image, and may be a camera, a camcorder, and/or a webcam, or the like.

The user input device 1420 may receive various types of data of the system 1000, input by a user, and may be a touch pad, a keypad, a keyboard, a mouse, and/or a microphone, or the like.

The sensor 1430 may detect various types of physical quantities that may be acquired from the outside of the system 1000 and may convert the sensed physical quantities into electrical signals. Such a sensor 1430 may be a temperature sensor, a pressure sensor, an illuminance sensor, a position sensor, an acceleration sensor, a biosensor, and/or a gyroscope sensor, or the like.

The communication device 1440 may transmit and receive signals between other devices outside the system 1000 according to various communication protocols. Such a communication device 1440 may be implemented to include an antenna, a transceiver, and/or a modem, or the like.

The display 1450 and the speaker 1460 may function as output devices that respectively output visual information and auditory information to the user of the system 1000.

The power supplying device 1470 may appropriately convert power supplied from a battery (not illustrated) mounted in the system 1000 and/or an external power source and may supply the converted power to each of the components of the system 1000.

The connecting interface 1480 may provide a connection between the system 1000 and an external device that may be connected to the system 1000 and may exchange data with the system 1000. The connecting interface 1480 may be implemented in various interface methods such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), NVMe, IEEE 1394, a universal serial bus (USB), a secure digital (SD) card, a multi-media card (MMC), an eMMC, a UFS, an embedded universal flash storage (eUFS), a compact flash (CF) card interface, or the like.

According to an example embodiment of the present inventive concepts, configurations and operations related to a storage device for separately storing hot data and cold data in memory regions having different bit-densities may be provided.

According to an example embodiment of the present inventive concepts, a storage device may quickly respond to a change in a workload pattern of a host, when hotness of a logical address received from the host is determined.

According to an example embodiment of the present inventive concepts, a storage device may accurately store hot data and cold data in memory regions to reduce write amplification (WAF) of the memory regions.

Various advantages and effects of the present inventive concepts are not limited to the above and will be more easily understood in the process of describing specific example embodiments of the present inventive concepts.

Additionally, hotness determiner 217, 517, parameter adaptor 218, 518, pattern detector 219, 519, packet manager 215, 515, FTL 214, 514, control logic 320, controller 1120, accelerator 1130, controllers 1310a, 1310b and/or the components included therein may include processor(s) and/or processing circuitry such as hardware including logic circuits; a hardware/software combination such as a processor executing software; or a combination thereof. For example, the processor(s) and/or processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While example embodiments have been illustrated and described above, it will be apparent to those skilled in the art that modifications and variations could be made without departing from the scope of the present inventive concepts as defined by the appended claims.

What is claimed is:

1. A controller for controlling a memory device including a first memory region and a second memory region having a first bit-density and a second bit density, respectively, comprising:
   a memory storing a logical address list including a number of received logical addresses;
   a central processing unit (CPU) configured to insert a latest received logical address, received together with a write command and data from a host, into the logical address list;
   a hotness determining circuit configured to assign a maximum weight to the latest received logical address, decrease weights of the received logical addresses included in the logical address list by a decay factor, and sum weights of the received logical addresses having values, equal to a value of the latest received logical address, to determine hotness of the latest received logical address;
   a pattern detection circuit configured to determine a repeatability index of the received logical addresses included in the logical address list; and
   a parameter adjustment circuit configured to decrease a magnitude of the decay factor based on the repeatability index, to upwardly adjust the weights of the received logical addresses,
   wherein the CPU is further configured to control the memory device to store the data in the first memory region or the second memory region based on the hotness of the latest received logical address.

2. The controller of claim 1, wherein the parameter adjustment circuit is configured to increase a size of the logical address list, and decrease the magnitude of the decay factor determined based on the size of the logical address list and the maximum weight.

3. The controller of claim 1, wherein the pattern detection circuit is configured to determine the repeatability index such that the repeatability index has a higher value, as diversities of the received logical addresses included in the logical address list lower.

4. The controller of claim 1, wherein the pattern detection circuit is configured to determine the repeatability index such that the repeatability index has a higher value, as a receiving cycle of each of the received logical addresses included in the logical address list shortens.

5. The controller of claim 1, wherein the parameter adjustment circuit is configured to upwardly adjust the weights of the received logical addresses included in the logical address list, when the repeatability index is equal to or higher than a threshold value.

6. The controller of claim 5, wherein the parameter adjustment circuit is configured to maintain or restore the weights of the received logical addresses included in the logical address list to their original values, in response to the repeatability index being lower than the threshold value.

7. The controller of claim 1, wherein the second bit-density of the second memory region is higher than the first bit-density of the first memory region, and
the CPU is configured to control the memory device to store the data in the first memory region, in response to the hotness of the latest received logical address being equal to or higher than a threshold value.

8. The controller of claim 7, wherein
the first memory region is a single level cell (SLC) memory region, and
the second memory region is a triple level cell (TLC) memory region or a quadruple level cell (QLC) memory region.

9. A method of operating a storage device including a first memory region and a second memory region having different bit-densities, comprising:
receiving a write command, a latest received logical address, and data from a host;
inserting the latest received logical address into a logical address list including a number of received logical addresses;
determining a repeatability index of the received logical addresses inserted into the logical address list;
adjusting weights of the received logical addresses included in the logical address list based on the repeatability index;
summing the weights of the received logical addresses having values, equal to a value of the latest received logical address, according to the adjusted weights to determine hotness of the latest received logical address; and
storing the data in the first memory region or the second memory region based on the hotness of the latest received logical address.

10. The method of claim 9, wherein the adjusting the weights of the received logical addresses included in the logical address list based on the repeatability index comprises:
adjusting a magnitude of a decay factor; and
assigning a maximum weight to the latest received logical address and decreasing the weights of the received logical addresses included in the logical address list by the decay factor.

11. The method of claim 10, wherein the determining the repeatability index comprises determining the repeatability index such that the repeatability index has a higher value, as diversities of the received logical addresses included in the logical address list lowers.

12. The method of claim 10, wherein the determining the repeatability index comprises determining the repeatability index such that the repeatability index has a higher value, as an interval at which each of the received logical addresses included in the logical address list is received shortens.

13. The method of claim 10, wherein the adjusting the magnitude of the decay factor comprises decreasing the magnitude of the decay factor, in response to the repeatability index being higher than a threshold value.

14. A storage device comprising:
a memory device including a plurality of memory regions having different respective bit-densities; and
a controller configured to
receive a write command, data, and a latest received logical address from a host,
determine hotness of the latest received logical address, based on a number of times of which logical addresses having values, equal to a value of the latest received logical address are received, and weights of the received logical addresses, and
store the data in any one of the plurality of memory regions, based on the hotness of the latest received logical address,
wherein the controller is further configured to determine a repeatability index based on a workload pattern of the host, and upwardly adjust the weights of the received logical addresses based on the repeatability index.

15. The storage device of claim 14, wherein the controller is configured to
insert the latest received logical address into a logical address list including a number of received logical addresses,
assign a maximum weight to the latest received logical address,
decrease weights of the received logical addresses included in the logical address list by a decay factor, and
sum weights of the received logical addresses having values, equal to a value of the latest received logical address, to determine the hotness of the latest received logical address.

16. The storage device of claim 15, wherein the controller decreases a magnitude of the decay factor, in response to the repeatability index being equal to or higher than a threshold value, to upwardly adjust the weights.

17. The storage device of claim 15, wherein the controller is configured to increase a size of the logical address list, in response to the repeatability index being equal to or higher than a threshold value, and adjust the decay factor based on the size of the logical address list and the maximum weight, to upwardly adjust the weights.

18. The storage device of claim 15, wherein the controller is configured to determine the repeatability index based on diversities of the received logical addresses included in the logical address list.

19. The storage device of claim 15, wherein the controller is configured to determine the repeatability index based on an interval at which each of the received logical addresses included in the logical address list is repeatedly received.

20. The storage device of claim 14, wherein the plurality of memory regions include a first memory region having a lowest bit-density, a second memory region having a medium bit-density, and a third memory region having a highest bit-density, and
   the controller is configured to
      store the data in the first memory region in response to the hotness of the latest received logical address being equal to or greater than a first threshold,
      store the data in the second memory region when the hotness of the latest received logical address is less than the first threshold and equal to or greater than a second threshold, and
      store the data in the third memory region when the hotness of the latest received logical address is less than the second threshold value.

* * * * *